(12) United States Patent
Sites et al.

(10) Patent No.: US 10,992,699 B1
(45) Date of Patent: Apr. 27, 2021

(54) SYSTEMS AND METHODS FOR DETERMINING A JOB SCORE FROM A JOB TITLE

(71) Applicant: KnowBe4, Inc., Clearwater, FL (US)

(72) Inventors: Eric Wayne Sites, Palm Harbor, FL (US); Ryan Scott Davis, Dunedin, FL (US); Daniel James DeCola, Clearwater, FL (US)

(73) Assignee: KnowBe4, Inc., Clearwater, FL (US)

(*) Notice: Subject to any disclaimer, the term of this patent is extended or adjusted under 35 U.S.C. 154(b) by 0 days.

(21) Appl. No.: 17/038,909

(22) Filed: Sep. 30, 2020

Related U.S. Application Data

(60) Provisional application No. 63/041,418, filed on Jun. 19, 2020.

(51) Int. Cl.
  *G06N 20/00* (2019.01)
  *H04L 29/06* (2006.01)
  *G06K 9/62* (2006.01)
  *G06N 20/20* (2019.01)

(52) U.S. Cl.
  CPC ........ *H04L 63/1433* (2013.01); *G06K 9/6215* (2013.01); *G06K 9/6256* (2013.01); *G06N 20/20* (2019.01); *H04L 63/1483* (2013.01)

(58) Field of Classification Search
  CPC .. H04L 63/1433; G06N 20/20; G06K 9/6215; G06K 9/6256
  See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |

(Continued)

FOREIGN PATENT DOCUMENTS

WO    WO-2016/164844 A1    10/2016

*Primary Examiner* — Khai M Nguyen
(74) *Attorney, Agent, or Firm* — Foley & Lardner LLP

(57) ABSTRACT

Embodiments disclosed herein describe a server, for example a security awareness server or an artificial intelligence machine learning system that establishes a job score for a user based on the user's job title. In embodiments, the vulnerability of a user to malicious cybersecurity attacks, the propensity for the user to engage with a malicious attack, and the severity of a malicious attack likely to be sent to the user and the severity of the harm to the user's organization is the user engages with the malicious attack is represented in a user risk score. The risk score for a user of a security awareness system, or for a group of users of a security awareness system, may be calculated based on one or more of a frequency score for the user, a propensity score for the user, a severity score for the user, and a job score for the user.

20 Claims, 14 Drawing Sheets

(56) References Cited

U.S. PATENT DOCUMENTS

| | | |
|---|---|---|
| 9,876,753 B1 | 1/2018 | Hawthorn |
| 9,912,687 B1 | 3/2018 | Wescoe et al. |
| 10,243,904 B1 | 3/2019 | Wescoe et al. |
| 2016/0164898 A1 | 6/2016 | Belani et al. |
| 2016/0301705 A1 | 10/2016 | Higbee et al. |
| 2017/0286865 A1* | 10/2017 | Fang .................... G06Q 10/105 |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2019/0356679 A1* | 11/2019 | Sites .................... H04L 63/1408 |

* cited by examiner

SYSTEMS AND METHODS FOR DETERMINING A JOB SCORE FROM A JOB TITLE

RELATED APPLICATIONS

This patent application claims the benefit of and priority to U.S. Provisional Patent Application No. 63/041,418, titled "SYSTEMS AND METHODS FOR DETERMINING A JOB SCORE FROM A JOB TITLE," and filed Jun. 19, 2020, the contents of which are hereby incorporated herein by reference in its entirety for all purposes.

FIELD OF THE DISCLOSURE

This disclosure generally relates to a data-driven approach to predicting the level of risk with respect to cybersecurity threats, that is associated with a user's position within their organization, from the user's job title. The disclosure also relates to determination of vulnerability scores for malicious cyberattacks using artificial intelligence.

BACKGROUND OF THE DISCLOSURE

Phishing attacks may be carried out on an individual or set of individuals for the purposes of extracting information from a device used by the individuals. A phishing attack (also referred to as a malicious attack) involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed (e.g., when the link is clicked) or prompts the user to execute a malicious program. Malicious actions may include malicious data collection or actions harmful to the normal functioning of a device on which the email was activated, or any other malicious actions capable of being performed by a program or a set of programs.

A method of performing simulated phishing attacks is as follows. The target of the simulated phishing attack is defined as the user to whom the simulated phishing attack is directed, i.e., the user that is being tested (also referred to as the recipient of the simulated phishing attack). A simulated phishing message is sent to the target's email address. The message can masquerade as a message from a party known to the target, such as an executive of the company that employs the target (also known as the target's organization). In some embodiments, the message can appear to be sent from a party unknown to the target. The message may be designed to appear interesting to the target and may make an offer or promise e.g. access to an interesting tidbit of news, access to useful computer software, access to knowledge of how to perform a money-making scheme, or any other thing that may be of interest. In some implementations, the message may request that the target perform a certain action, such as providing sensitive information by replying to the message or transferring money to an account owned by the attacker and then sending a reply message to confirm that the money has been transferred. The message may request the target to perform any action that could result in a security breach and/or harm to the company that employs the target if the simulated phishing message were a real phishing message (e.g., a real malicious attack).

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to extract sensitive information using phishing methods, and any extracted information is used not for malicious purposes, but as part of a process of detecting weaknesses in security. Performing a simulated phishing attack can help expose weaknesses in the security infrastructure and is meant to protect users and/or devices from phishing attacks or other computerized, cyber, or digital attacks. It may also expose a lack of vigilance and/or know-how in a user or set of users of a device in minimizing risk associated with such attacks. This can allow a security manager to pinpoint specific issues to be resolved and to bolster security as appropriate. A simulated phishing attack may be performed by e.g. a security manager, or by a third party on behalf of a security manager.

BRIEF SUMMARY OF THE DISCLOSURE

In some implementations, each simulated phishing message sent to a target may include a unique identifier which associates that simulated phishing message with that target. For example, a unique identifier may be a series of numbers and/or letters, or a unique string of characters included in the subject of the message, in the body of the message, or in the message headers. In some other examples, the unique identifier may be a unique message address, for example in either the "To", "From:" or the "Cc:" field of an email. In still other examples, the unique identifier may be included within a separate file that is attached to the email.

The unique identifier can help the security awareness system to determine the identity of a user who was first sent the simulated phishing message when the message is reported to the security awareness system as a malicious threat. In implementations in which the unique identifier is included within simulated phishing message, if the message is forwarded by the target to any other user, and the forwarded message including the unique identifier is reported to the security awareness system as a malicious threat, the forwarded message can be processed to extract the unique to identify the original target of the simulated phishing message, regardless of which user ultimately sends the simulated phishing message back to the security awareness system. Thus, even if the simulated phishing message received at the security awareness system is sent from an address that is not known to be associated with a particular target, the unique identifier can help to determine the identity of the target of the simulated phishing message. In embodiments, forwarding a received simulated phishing message can be classified as a failure. Therefore, the security awareness system must be able to identify the original target of the simulated phishing message. Once the identity of the target has been determined, a record of the target's failure can be stored.

Information contained in a security awareness system may be combined with information from external sources and used collectively to profile a user or group of users' past behavior. This profile may be then used to predict a user's future behavior. A system comprising one or more servers can be configured to derive a measure of potential risk with respect to cybersecurity attacks. In embodiments, a risk score (which may also be called a vulnerability score) is used to represent how vulnerable an organization's users are. A risk score may be calculated for an individual user, a group of users, or the organization as a whole.

Based on at least the risk score, the server may display a probability that the user will respond to a subsequent hit of a type of malicious attack at a point in time. Where a user's overall risk or vulnerability can be characterized, a system may proactively act to protect the user, the system, or the organization from actions that the user may make in the future.

Various data may be considered in determining or creating a user risk score, such as the frequency a user receives malicious attacks, the severity of those attacks (for example, how difficult to detect the attacks are, and/or the severity of the harm that may befall the user's organization if the user responds to the malicious attack), the propensity of a user to respond to a malicious attack. A risk score derivation may incorporate or be based upon user records reflecting user training history, user phishing history, user responses to simulated phishing attacks and real malicious attacks, user demographic information, information about the organization that the user is associated with, user breach data, user-assessment surveys and data which may be obtained from a security information and event management system (STEMS). A group risk score determined by the system may take into account the user risk scores of users which are members of a group.

The system may also determine a user job score that indicates the level of risk that a user presents to an organization based on their role in the organization. The job, position or role that a user has in an organization may be indicative of how frequently the user is presented with a malicious attack, how likely a user is to respond to a malicious attack, or how the potential severity of consequences of a malicious attack based on the degree of access the user has to critical systems and servers of their organization. A user's job, position or role in an organization may additionally or alternatively impact the amount of inbound and outbound communication that the user sees in a day, or the level of distraction that a user is likely to experience. It is therefore very important to be able to accurately assign a job score for a user.

It is a challenge however to assign accurate job scores for users based on their job, position, or role in any organization using known systems and methods. Job titles vary extensively from organization to organization, with many positions that represent similar levels of vulnerability taking on very different job titles. Job titles that refer to largely similar roles and positions may have names that are similar but not exactly the same or may use very different names. Searching for key words or terms in a user's job title as a method to assess a user's job score based on their job title is problematic because of this extensive variability in job titles.

One of the primary challenges in utilizing a user's job title is to map its string representation to a numeric scale that indicates a level of risk. One method for determining the user's job score based on the user's job title is to compare the job title to a set of expressions, for example, which are derived from known job titles. 'Regex' is shortened version of 'regular expression' and is a string of text that is useful for creating patterns to match, locate, and manage text. An example regex search based on a set of expressions, such as is implemented in U.S. Pat. No. 10,673,876, is as follows (the character "|" represents "or" in the expressions):

if (title==None or title==38 ):
        return 0
    if re.search('accounting|information tech|\Wit\W', title.lower( )):
        return 5
    if re.search('chief exec|chief operat|chief financ|CEO|CFO', title.lower( )):
        return 10
    if re.search('vp|director|managing|manager|president|chief|senior|lead', title.lower( )):
        return 6
    return 0

Experimentation across thousands of organizations' Active Directory data has shown that applying common search terms such as the name of departments (e.g., accounting|finance), or keywords associated with the name of a position (.e.g., chief exec|chief oper|chief finance|CEO|CFO|vp|director|managing|manager|president|chief|senior|lead) has shown that less than 20% of users that have a job title listed in the Active Directory data match one of these search terms and receive a job score. Those users that don't fit into one of these categories may be assigned a default job score, as shown in the example above where users without a match are assigned the job score of '0'. Users that match some of the same search terms may be grouped together even when their complete job titles are very different. No attention is given to localization and special characters in job titles. The result is a job score that is not data-driven and that may be highly inaccurate in representing the responsibility that the user has, the access to organizational systems that the user has, and so on. The position or role of the user in their organization has a strong influence of the overall risk level for that user because it reflects at least three important aspects of the risk that the user poses to their organization: the likelihood of a malicious attack on the user, the likelihood that the user has access to financial resources or sensitive data, and the likelihood that the user is distracted and less able to carefully assess incoming messages (e.g., the likelihood that the user will respond to, or interact with, the malicious attack). Accordingly, new systems and methods for determining user job scores are needed.

In embodiments, one or more servers are configured to determine a level of cybersecurity risk of a user using a model, such as an ensemble model or artificial intelligence model that is configured to read a user's job title at a character by character level, detect patterns in the character sequence, and output a job score according to the job title, wherein the job score is indicative of the risk level of the user with respect to cybersecurity awareness associated with their job or position in the organization of the user. A user may be an employee of an organization.

In embodiments, the one or more servers are configured to use data records of one or more organizations' employees, the data records comprising the organizations' employees' job titles, the employees' email addresses and the email address(es) of the employees' direct manager, to generate topologies or hierarchies of each organization, which may be referred to as organization graphs. In some examples, a centrality measure for each node of the one or more organization graphs is determined by the one or more servers, the centrality measure representing the relative importance of the employees in an organization. In examples, the one or more servers may select the centrality measure as one of a harmonic centrality measure, a betweenness centrality measure, a degree centrality measure, a closeness centrality measure, an Eigen centrality measure, and a PageRank centrality measure. The centrality measure of a node of an organization graph may be determined by the one or more servers using an artificial intelligence machine learning system or model. In examples, the centrality measures for the nodes of the organization graphs are used to create input records, each input record comprising the job title of the employee of the node and the job score of the node, wherein the job score is the centrality measure determined for the node. In embodiments, the centrality measure for an organization graph is determined by the one or more servers using a recurrent neural network (RNN) artificial intelligence model. In examples, the centrality measure determined for the nodes of an organization map is a harmonic centrality measure, a betweenness centrality measure, a degree centrality measure, a closeness centrality measure, an Eigen centrality measure, or a PageRank centrality measure.

In some examples, input records comprising job scores assigned to job titles are used by the one or more servers to train an artificial intelligence machine learning system or model to determine a job score when a job title is input into the model. In examples, the one or more servers may retrain the ensemble model when new input records become available. In some examples, an instance of training a model with a group of input records is referred to as a training epoch, and the model that results from this training may be referred to as a period model. One or more period models may be averaged together to form an ensemble model. In embodiments, the ensemble model is determined by moving an averaging window over a number of period models, where when a new period model is trained, the oldest period model in the averaging window is removed from the average, and the new period model is added to the averaging window. Where only one period model is included in the average, the period model and the ensemble model are equivalent. In embodiments, the ensemble model is configured by the one or more servers to determine a job score for a user when the user's job title is provided by the one or more servers as an input to the ensemble model. In examples, the one or more servers may retrain the ensemble model when new input records become available. In examples, the one or more servers receive the job score for a user from the ensemble model and determine, using at least the job score of the user, the level of cybersecurity risk of the user, or the user's risk score.

In embodiments, the distribution of assigned job scores in the input records used to train a period model is uneven, that is the occurrence of some job scores in the input records used to train the period model is greater or less than the occurrence of other job scores in the input records used to train the period model. In examples, the one or more servers may modify or add to the group of input records used as training data for the period model. In examples wherein one or more job scores occurs less frequently in the input records than one or more other job scores, the one or more servers may replicate the input records comprising the less frequent job scores, and the training data comprises the replicated input records in addition to the original group of input records. In some examples, the one or more servers may generate additional input records comprising the less frequently occurring job scores by perturbing the job titles in input records that comprise the less frequently occurring job scores and the training data comprises the perturbed input records in addition to the original group of input records.

In examples, the one or more servers inputs a job title of a user to the ensemble model and the ensemble model determines a job score for the user. In some examples, the one or more servers may input job titles of users to the ensemble model character by character. In some examples, the job title of a user may be input into the ensemble model to determine the job score of the user by the one or more servers, beginning with the first character of the job title and ending with the last character of the job title. In some examples, the job title of a user may be input into the ensemble model to determine the job score of the user by the one or more servers, beginning with the last character of the job title and ending with the first character of the job title. In some examples, portions of the job title of the user may be input by the one or more servers into the ensemble model to determine the job score of the user.

In some examples, a frequency score aspect of a user risk score is determined by the one or more servers based at least on a user job score. In embodiments, a severity score aspect of a user risk score is determined by the one or more servers based at least on a user job score. In embodiments, a propensity score aspect of a user risk score is determined by the one or more servers based at least on a user job score. In examples, the user risk score is determined by the one or more servers based at least upon a user job score.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes an artificial intelligence network and environment which may be useful for practicing embodiments described herein.

Section C describes embodiments of systems and methods determining job scores as part of the calculation of a user or group risk or vulnerability score for malicious cyberattacks, for example using artificial intelligence as part of a security awareness system.

A. Computing and Network Environment

Figure 1A:
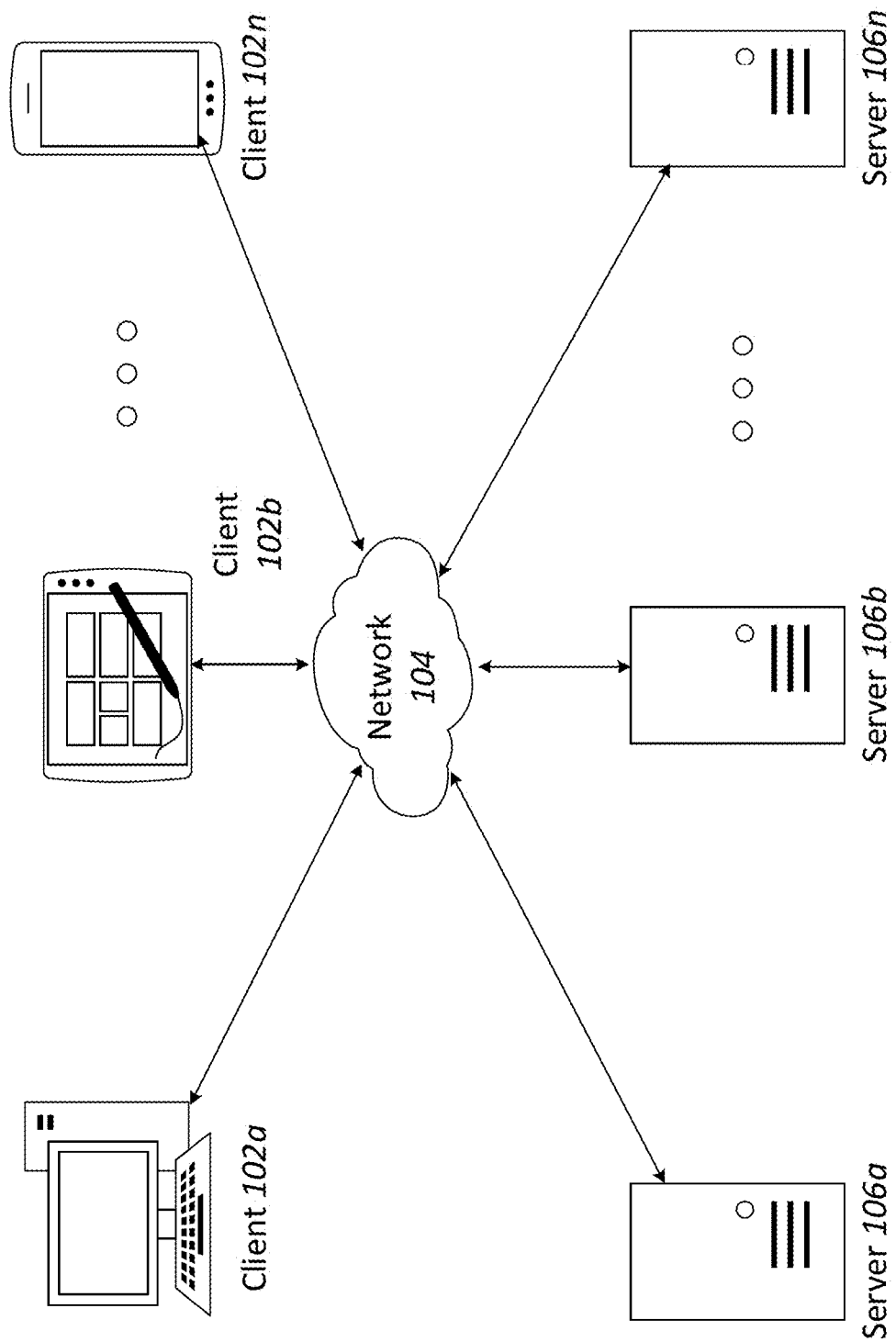
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, 4G or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, SDMA, SC-FDMA or OFDMA. In some embodiments, different types of data may be transmitted via different links and standards. In other embodiments, the same types of data may be transmitted via different links and standards.

The network 104 may be any type and/or form of network. The geographical scope of the network 104 may vary widely and network 104 can be a body area network (BAN), a personal area network (PAN), a local area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. Network 104 may be a type of a broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
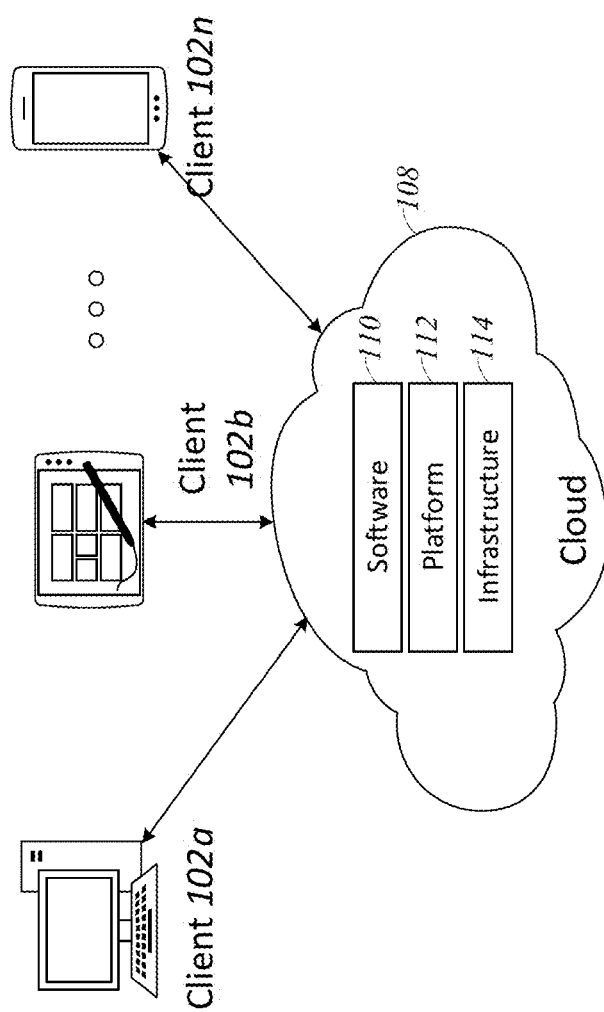
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
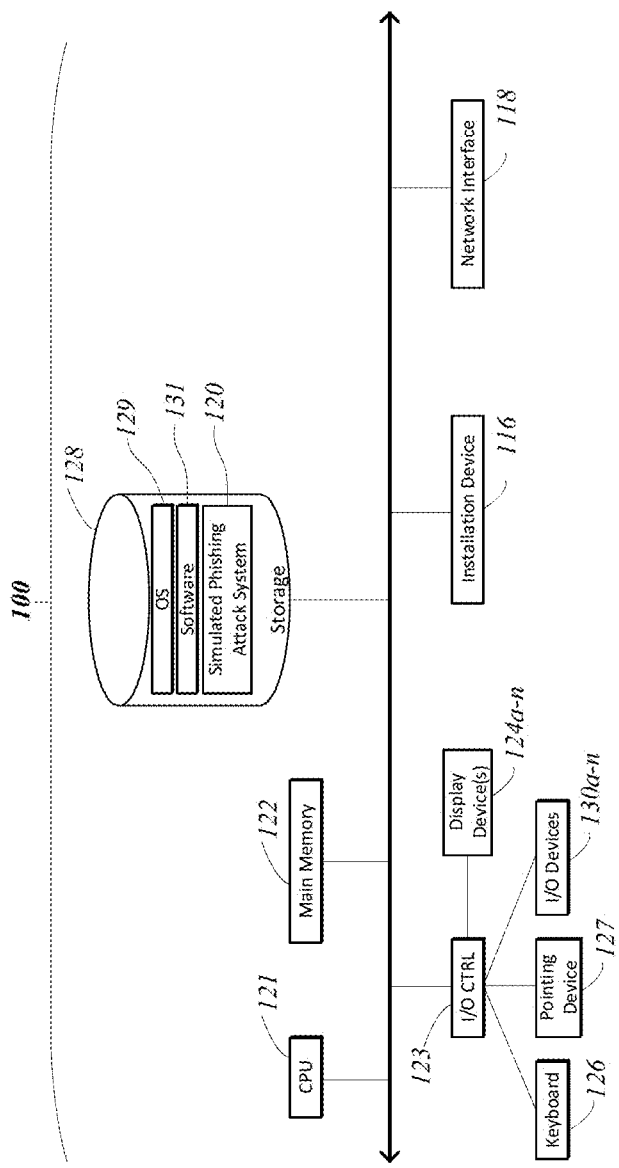
FIGS. 1C and 1D are block diagrams depicting embodiments of computing devices useful in connection with the methods and systems described herein.
Figure 1D:
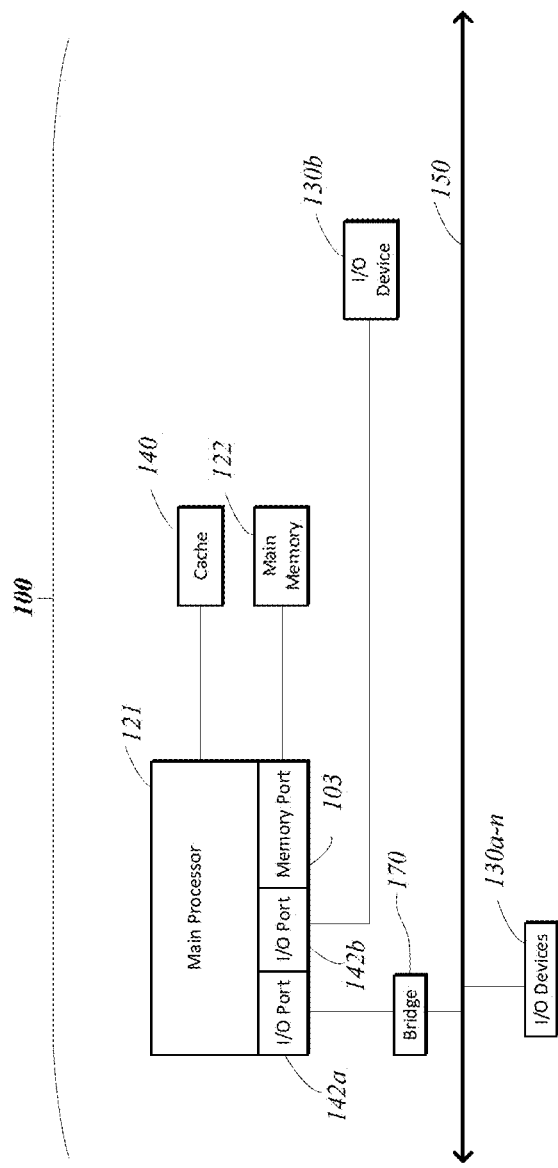

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122 or cache 140. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random-access memory (DRAM) or any variants, including static random access memory (SRAM), Burst SRAM or SynchBurst SRAM (BSRAIVI), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. In other embodiments, cache memory 140 may be part of the main processor 121. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search, and ALEXA by Amazon.

Additional devices 130a-130n have both input and output capabilities, including, e.g., haptic feedback devices, touchscreen displays, gesture input devices, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices.

Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Artificial Intelligence (AI) Network and Environment

An intelligent agent is any system or device that perceives its environment and takes actions to maximize its chances of success at some goal. The term artificial intelligence (also referred to as AI) is used when a machine mimics cognitive functions such as learning and problem solving. One tool used for artificial intelligence is an artificial neural network. Some exemplary types of artificial neural network that may be used for artificial intelligence and machine learning are feedforward neural network-artificial neuron, radial basis function neural network, kohonen self-organizing neural network, recurrent neural network (RNN), convolutional neural network (CNN), Deep Neural Network (DNN), Long Short-Term Memory Network (LSTM, a type of RNN), Feed Forward Neural Network (FFNN, a kind of DNN), Gated Recurrent Unit Network (GRU, a kind of RNN), Deep belief networks (DBN) Multilayer network, and Deep Stacking networks (DSN) Multilayer Network. The structure of AI models may be bidirectional or unidirectional. AI models may use, for example, regression predictive modeling or classification predictive modeling. The term 'feature' is used to refer to data that are fed into an AI model as inputs into the model or for training. Features may be fed into one or more AI models separately or in combination. AI models may be optimized for certain kinds of data inputs, for example a univariate model will be fed one feature at a time, whereas a multivariate model will be fed multiple features at one. One or more models or combinations of models may be used.

Examples of artificial intelligence algorithms and machine learning models include reinforced learning, logistic regression, statistical regression, decision trees, linear regression and naïve bayes classified algorithms. Although the term 'neural network' is used in the description of the technology in this disclosure, it is to be understood that any type of artificial intelligence algorithm, whether or not classified as an artificial neural network, may be used to enable the present technology.

Artificial neural networks (also referred to as neural networks) are modeled after the neurons in the human brain, where a trained algorithm determines an output response for input signals. The main categories of neural networks are feedforward neural networks, where the signal passes only in one direction, and recurrent neural networks, which allow feedback and short-term memory of previous input events.

A wide variety of platforms has allowed the development of different aspects of AI. Advances in deep artificial neural networks and distributed computing have led to a proliferation of software libraries, including Deeplearning4j, which is open-source software released under Apache License 2.0 and supported commercially by Skymind of San Francisco, Calif., and TensorFlow, an artificial intelligence system which is open-source released under Apache License 2.0, developed by Google, Inc.

Deep learning comprises an artificial neural network that is composed of many hidden layers between the inputs and outputs. The system moves from layer to layer to compile enough information to formulate the correct output for a given input. In artificial intelligence models for natural language processing, words can be represented (also described as embedded) as vectors. Vector space models (VSMs) represent or embed words in a continuous vector space where semantically similar words are mapped to nearby points (are embedded nearby each other). Two different approaches that leverage VSMs are count-based methods and predictive methods. Count-based methods compute the statistics of how often some word co-occurs with its neighbor words in a large text corpus, and then maps these count-statistics down to a small, dense vector for each word. Predictive models directly try to predict a word from its neighbors in terms of learned small, dense, embedding vectors.

Neural probabilistic language models are traditionally trained using the maximum likelihood (ML) principle to maximize the probability of the next word given previous words (or context) based on the compatibility of the next word with the context. The model is trained by maximizing its log-likelihood on a training set. The objective is maximized when the model assigns high probabilities to the words which are desired (the real words) and low probabilities to words that are not appropriate (the noise words).

In some embodiments, the learned values from a neural network may also be serialized, for example on a disk or any permanent or transient storage device, for doing the inference step at a later time. These learned values may be stored in multidimensional arrays that also contain shape and type information while in memory.

C. Systems and Methods for Determine Job Scores Indicating Cybersecurity Vulnerability from Job Titles The following describes systems and methods of creating job scores indicative of users' cybersecurity vulnerability in relation to users' job titles and roles in an organization. The job scores of users, for example determined by one or more servers using artificial intelligence, are useful in a security awareness system when determining a user's risk score with respect to cybersecurity threats. A user risk score (which may also be called a vulnerability score) may take into consideration a job score of the user which in some examples is determined by at least the job, position or role that the user has in an organization. The job, position or role that a user has in an organization may be indicative of how frequently the user is presented with a malicious attack, how likely a user is to respond to a malicious attack, or how severe the consequence of the user responding to a malicious attack may be to the organization, which may for example be influenced by how much access the user has to critical systems and servers of their organization. The job, position or role that a user has in an organization may additionally or alternatively impact the amount of inbound and outbound communication that the user sees in a day, or the level of distraction that a user is likely to experience. It is therefore very important to be able to accurately assign a job score for a user.

A system comprising one or more servers can be configured to derive a measure of potential risk, individualized for each user. A risk score may be calculated for an individual user, a group of users, or the organization as a whole.

In some embodiments, a risk score framework is created. In some examples, the framework comprises an artificial intelligence machine learning system configured to determine user risk scores and group risk scores. In some examples, the risk score framework outlines the data that are considered in determining or creating a user risk score, such as the frequency a user receives malicious attacks, the severity of those attacks (for example, the severity of the harm that may befall the user's organization if the user responds to the malicious attack), the propensity of a user to respond to a malicious attack. In some examples, the risk score framework outlines the method of calculating the risk score. In some examples, the risk score derivation may incorporate or be based upon user records reflecting user training history, user phishing history, user responses to simulated phishing attacks and real malicious attacks, user demographic information, information about the organization that the user is associated with, user breach data, user-assessment surveys and data which may be obtained from a STEMS. User-assessment surveys may include questions such as, "Under which of the following circumstances is it acceptable to share a password with a co-worker?" In a user-assessment survey, the system may present multiple-choice answers for the user to select. The returned information may be interpreted as a cybersecurity awareness strength or weakness, and the returned information or the interpretation of the returned information may be used to determine specific training or simulated phishing templates to send the user. Other questions may focus on a user's perceived confidence or knowledge in different areas. In embodiments, questions in a user-assessment survey focus on a user's attitude towards, and knowledge of specific security risks or situations. In embodiments, the system takes responses to user assessments into account in determining the best way to target that user or test their knowledge on a specific topic.

In some examples, the sophistication of the user's response to various real malicious attacks and simulated phishing attacks may be given a score or a ranking, for example, a user's response may be given a low score (for example, 0 or 1), representing the least sophisticated response, up to a high score (for example 5 or 10), representing the most sophisticated response, and the score or ranking of the user's response to various real malicious attacks and simulated attacks may be considered when determining or creating the user's risk score. In embodiments, the system may consider user training records when determining the risk score. For example, cybersecurity awareness training that the user has completed, the time spent engaged in training activities, the duration of the training modules that the user has completed, and other details related to the training or learning related to cybersecurity awareness and how to recognize malicious attacks that the user has undertaken may be considered by the system in creating the user's risk score.

A group risk score determined by the system may take into account the user risk scores of the users which are members of the group. The system, when determining a user risk score, may take into account one or more dimensional scores. For example, a user risk score may incorporate or be determined by the system based on one or more of a frequency score, a propensity score, a severity score, and a job score. In general, a user or group risk score is a representation of the risk posed to an organization if the user or group of users is subject to a malicious attack.

In some embodiments, a user's demographics are integrated as sources of data that may be considered by the system when creating the user's risk score. For example, the user's age, gender, and tenure at a current job may be considered by the system when creating the user's risk score. In some embodiments, the user's organizational unit, job title, and manager may be considered by the system when creating the user's risk score. In some examples, the user's membership in distribution lists or groups may be taken into consideration by the system in calculating the user's risk score. In embodiments, information about data breaches related to the user or to the organization may be considered by the system when creating the user's risk score. The aforementioned are non-limiting examples of the type of data related to a user that may be considered by the system when creating the user's risk score.

A server, for example a security awareness server or an artificial intelligence machine learning system, may be configured to establish a risk score or vulnerability score for a user of a security awareness system or for a group of users of a security awareness system. The calculated risk score or vulnerability score reflect several aspects of the cybersecurity risk that the user or group of users in an organization presents to the organization. For example, the server may create a frequency score for a user, which predicts the frequency at which the user is likely to be targeted by a malicious attack. The server may also determine a propensity score that identifies the propensity of the user to respond to a malicious attack. The server may also determine a severity score that identifies how severe the outcome of the user's response to the malicious attack is likely to be. The server may also determine a job score that indicates the level of risk that a user presents to an organization based on their role in the organization. One or more other scores reflecting aspects of the overall risk that a user or group of users presents to an organization with respect to cybersecurity risk can also be envisioned.

A predictive artificial intelligence (AI) model, which may also be referred to as an artificial intelligence machine learning system or simply as a model, may be trained to calculate a frequency score, a propensity score, a severity score and/or a job score for a user. In examples, training input may comprise the user's history with respect to real cybersecurity attacks and simulated cybersecurity attacks. For example, whether or not the user responded with a type of response (or one or more different types of responses) for a given instance of a type of malicious attack (or one or more different types of malicious attacks) or a given instance of a type of simulated attack (or one or more different types of simulated attacks) may be used to train the model. Any or all of a frequency score, a propensity score, a severity score and a job score may be determined based on the training of this model.

Based on one or more of the frequency score, the propensity score, the severity score, and the job score, the server may establish a risk score for the user. The risk score determination may be a function of at least these three scores, and the function may be a weighted function or logarithmic function of at least these scores. A group risk score can be calculated based on a function of risk scores of each user within the group of users, for example the average of risk scores of each user within the group, the sum of the risk scores of each user within the group, a weighted average of risk scores of each user in the group, and so on. Other information related to a user may additionally or alternatively be used to determine a user risk score or a group risk score, or any of the component scores (frequency score, propensity score, severity score, and job score) used to calculate the user or group risk score.

Information contained in a security awareness system may be combined with information from external sources and used collectively to profile a user or group of users' past behavior. This profile may be then used to predict a user's future behavior. Based on at least the risk score, the server may display a probability that the user will respond to a subsequent hit of a type of malicious attack at a point in time. Where a user's overall risk or vulnerability can be characterized, a system may proactively act to protect the user, the system, or the organization from actions that the user may make in the future.

In some embodiments, an artificial intelligence model configured to determine a job score for a user may consider different features that relate to the user. For example in the context of the present disclosure, individual features or sets of features can be input into an artificial intelligence model. An artificial intelligence model useful for the present invention can use features to infer or predict an organization's hierarchy or to calculating a user's job score based on the user's job title. In some examples, character strings from part of all of a job title are input into the artificial intelligence model, which will determine a job score for any job title. Examples of alternative or additional features that may be fed into one or more artificial intelligence models separately or in combination to determine a job score for a user or a risk score for a user include:

Phish-prone percentage—The likelihood of the user falling victim to a phishing attack, for example based on simulated phishing attack results or responses to actual malicious attacks.

Security awareness training status—The type of training module(s) the user has completed and how much time the user has spent in training.

Breach data—A reflection of whether the user's information has been found in one or more data breaches. In some examples of security awareness systems, user breach information will be listed on a user's timeline and/or individual user report card.

Job function—Based on their job function, users with more responsibility may be assigned a higher risk score.

User risk booster—A high risk user's risk score can be boosted manually in their user profile, for example by a security awareness system administrator.

Group risk booster—A user's personal risk score can be impacted by a group risk booster when the user is added to a group.

Depth of the user in the organization—The hierarchy above a user's position in an organization (for example a data entry user may be ten organizational levels below the CEO) or the number of people above the user in the organization (for example a user has ten managers above them).

Height of the user in an organization—The hierarchy below a user's place (for example a user manages 5 levels down), or how many people are reporting to a user (for example a user manages (directly only, or directly and indirectly) 15 people on a team.

The length of time the user has been at the organization.

The age of the organization.

How long the company has been using a security awareness system or platform.

User languages which may result in the same job titles in different languages.

The size of the organization.

The user's results from a security awareness quiz or survey.

The industry the organization of the user is a part of

An organization graph centrality metric for the user.

Any other user or organizational metric.

In embodiments, the features may be integrated into data sets used to train machine learning models. Data sets may also be referred to as data records, input records, or simply records. In some examples, the machine learning models are configured by the system to predict user responses to malicious attacks based on the integrated data, data sets, data records, input records, or records. In some examples, the machine learning models are configured by the system to predict the severity to the organization of a user's response to a malicious attack, or of a user responding to a malicious attack. In some embodiments, data collection is performed by the system on an ongoing basis, and updated data and/or data sets and or input records may be used by the system to re-train machine learning models or create new machine learning models that evolve as the data changes.

In embodiments, the risk score of an individual may be represented as:

$$\text{Risk Score}(RS) = f\{f(H), p(R|H), s(R,H)\} = RS(f,p,s)$$

wherein:
H=a hit, defined as any kind of malicious attack
f(H)=frequency of potential harmful hits H
p(R|H)=the propensity that an individual will respond to a hit H
R=individual response, e.g. a click, reply, etc.
s(R,H)=the severity of the impact of response R to hit H subject to constraints:

RS(0,0,0)≥0
RS(1,1,1)=100

In some embodiments, RS(f, p, s) is an increasing function of each of its variables: f, p, and s.

In some embodiments, user responses can include a multitude of user actions, for example but not limited to a user opening a message, clicking on a link in a message, replying to a message, opening an attachment to a message, enabling a macro in a message, entering data in response to a message, reporting a message, or forwarding a message. In some examples, data reflecting user responses may be aggregated, or temporal information may be included, for example the number of days since a user last responded, or how many instances of each type of user response (or any type of user response) in the last, e.g., 30 days, 3 months, 1 year, etc.

In some embodiments, the training and learning history of a user may be partitioned by the system based on the type of course or module that the user performed or completed. In some examples, the training history may be divided by the system into short modules (less than a predetermined duration) or long modules (greater than a predetermined duration). In some examples, training history may be divided by the system based on the type of training, for example classroom training or online training. Training history may include courses that the user is enrolled in by the system, courses that the user has chosen to enroll in voluntarily, courses that the user has started, or courses that the user has completed. Training history may include the time interval between completed training courses.

In some embodiments, user data may be arranged by the system in a tabular format, whereby the rows of the table represent a phish instance for a user which may include a detailed representation of the user and their phishing and training history at a given point of time. In some embodiments, when training a risk score model, the system uses information in a table to learn how the user responded to a specific simulated attack or real malicious attack given their history at the time of the attack.

In some examples, a component of the risk score calculation is f(H), which reflects the frequency at which individuals are hit with a malicious attack (H). In some embodiments, this information is based on two proxies in the data, job score and breach score. As previously discussed, in previous embodiments, the job score may be defined as follows:

$$\text{Job Score(job title)} = J = (0,5,6,10)$$

wherein:
0=does not match a category or no information available
5=accounting or IT
6=high level, e. g. manager, director, lead
10=executive, e. g. Cx0

It is understood that these example job classifications are demonstrative, and any job classifications may be used by the system, and more or fewer job scores may be enabled by the system.

In some embodiments, a breach score may be based on an email exposure check (EEC) threat level, for example a breach score may be defined as follows:

$$\text{Breach Score(EEC)} = B = (0,3,10)$$

wherein:
0=the user has negligable email exposure
3=the user has moderate email exposure
10=the user has high email exposure It is understood that these example breach scores are demonstrative, and any breach scores may be used by the system, and more or fewer breach scores may be enabled by the system. In some embodiments, breach score information may be decayed by the system over time. In some examples, if the data supporting the breach score inputs is sparse or does not exist or if the user has a job title which does not match any of the classification in the approach shown above, the frequency score f (H) may take on a baseline value.

In some examples, a component of the risk score calculation is severity s(R, H), which reflects the severity of the impact to the user's organization of the user's response R to a malicious attack or hit H. s(R, H) may be a function of the access that a user has to sensitive or confidential information within the user's organization. In some embodiments, the severity s(R,H) may be a function of a risk booster value, which may be set by a company or system administrator to customize the assessed risk of individual users or of groups of users. In some embodiments, the severity score s(R, H) may be defined as follows:

$$s(R,H)=(-1,0,1,10)$$

wherein:
−1=below normal risk
0=normal risk (default)
1=elevated risk
10=very high risk It is understood that these example severity score classifications are demonstrative, and any severity score classifications may be used by the system, and more or fewer severity scores may be enabled by the system.

Although a lot of functions satisfy these criteria, a natural family of candidates would need to convey the multiplicative nature of the risk score (RS). In examples, the components of RS, that is f, p, and s, are a representation of the expected loss or damage to the organization due to malicious attacks over a period of time. The function RS(f, p, s) in some embodiments may be represented as a weighted sum of logarithms:

$$RS(f,p,s)=w_1 \log f + w_2 \log p + w_3 \log s$$

In some embodiments, the function RS(f, p, s) may be represented as follows:

$$RS(f, p, s) = \frac{w_1 \log(1 + J + B) + w_2 \log(1 + p(R|H)) + \frac{w_3 \log\left((1+J)\left(1.5 + \frac{RB}{2}\right)\right)}{d}}$$

where in one example:
$w_i$=settable parameters, normalized so that $0 \le RS \le 100$
J=job score (0,5,6, or 10)
B=breach score (0,3, or 10)
RB=severity (s)(−1,0,1,10)

and:

$$d = \frac{\log(21 + 100\log(2) + \log(11 \times 6.5))}{100} = 0.77 \text{ when } w_i = 1$$

In some embodiments, the propensity of RS, p(R|H) is defined as the likelihood that a user will respond to a malicious attack. In examples, p(R|H) represents a predictive model component of the risk score RS. In some examples, p(R|H) may be produced by training statistical and/or neural network models to learn the mapping from a set of input features or input records, to the propensity that a user will respond to a malicious attack. In some examples, input features may include user history as to whether or not the user has previously responded (response R) to a given malicious attack (H). In some examples, after repeated exposure to millions of samples, the statical or artificial intelligence models are able to learn to predict with some success whether or not users with given malicious attack response and training histories are likely to perform a response R given a malicious attack H. Given enough training data, models are able to predict a variety of different user responses R to a variety of different malicious attacks H.

In some embodiments, a model's output of the propensity of RS, p(R|H) is the probability that a given user will respond to, for example click, a malicious attack, for example a phishing email, at a particular point in time. The same user may exhibit a different propensity p(R|H) at a later time. For the system to evaluate the predictive performance of the model, more than one malicious attack is required, allowing the model to predict the click rate of a user over a period of time and compare it to the user's actual click rate over that same period of time. For example, assume the period of time is one year: for each user, the model calculates the predicted p(R|H) each time a malicious attack or a simulated malicious attack hits over one year and records whether or not the user clicked (that is, the user response rate to actual malicious attacks and simulated malicious attacks). A person of skill in the art understands that p(R|H) is harder to predict and more variable for users with few actual and simulated malicious attacks. The more data related to actual user responses to actual and simulated malicious attacks that is available about a user, the more accurate the risk score RS becomes and in particular the propensity aspect of the risk score, p(R|H). In some embodiments, the performance of a model is assessed by predicting the number of clicks over a period of time and comparing it to the user's actual clicks over that period of time.

The value of p(R|H) is a very good predictor in the aggregate for a group of users with similar profiles. When users are categorized by the system according to their predicted p(R|H) value, the percent of actual clicks in each category closely tracks the predicted p(R|H) value for the category. Uncertainty at the individual level gets smaller when groups of individuals are aggregated by the system. Similarly, the propensity component, p(R|H), of the risk score RS becomes more predictive (that is, more accurate) as the number of phish events increases. In some embodiments, accuracy of prediction can be improved by taking multiple events into account for each user. In embodiments, accuracy of prediction can be improved by aggregating the expected click rate at the level of a group (e.g., including the individual expected click rate of all members of the group). The use of the highest individual risk score (or aspect of a risk score, such as the frequency, the propensity, or the severity) in a group as the risk score for the group is inaccurate as it puts too much weight on one single estimate. The average over all individual risk scores (or aspect of a risk score, such as the frequency, the propensity, or the severity) in the group is one possible approach to aggregating the risk scores, however this may tend to underestimate the contribution of isolated outliers. In some examples, the approach taken may be referred to as using the standard distance to the perfect score (0), described as follows:

$$RS(\text{group}) = \sqrt{\frac{1}{N}\sum_{i=1}^{N}(RS(i)^2)}$$

wherein:

N=number of group members

RS(i)=individual risk score of member i

As an example, consider the case where N=100, RS (1)=100, and RS(i)=0, i=2: 100. Then, $RS_{max}$=100, $RS_{average}$=1, and $RS_{group}$=10.

In some embodiments, user training histories are used by the system in predicting p(R|H) values for a group of users. When more users have had training, p(R|H) for the group of users is low, and when fewer users have had training, p(R|H) for the group of users is high. In some examples, when the training that users in the group have had is more recent, p(R|H) for the group is lower.

Returning now to the calculation by the system of a user's risk score, one of the inputs into the risk score calculation is the user's job score. The job score is critical to modulating the overall risk score because it implicitly reflects at least two important aspects of the risk that the user poses to their organization. In one aspect, the likelihood of a malicious attack on the user (impacting the frequency score, f), is influenced by the user's job score. For example the CEO of an organization has a higher job score in the above example, which may be reflective of the CEO being more likely to be attacked due to a known attack vector called CEO Fraud. In one aspect, the degree of severity of an attack on the user is influenced by the user's job score. For example, a Chief Information Office (CIO) may have access to a significant amount of sensitive information, and so the CIO has a higher job score which is reflective of the likelihood that this user has access to financial resources or sensitive data.

For this reason, the user's job score, which in examples is based on the user's job title, modulates at least two aspects within the risk score formulation and can potentially increase the final risk score of a user by a significant amount. Therefore, it is especially important for the validity and accuracy of the risk score that the job score is reliable.

A primary challenge in the system utilizing a user's job title to determine the user's job score is the very large number of possible job titles, and how much variation there can be from job titles used in different organizations. Associating specific search terms with job scores, as described in U.S. Pat. No. 10,673,876 and previously shown, has the limitation that the user's job title is matched by the system against specific keywords or key terms, and the user is assigned a job score of '0' if there is no match. Another limitation is that the same job title may vary in its position in the hierarchy from company to company, and the job score for a given job title may not reflect this variability.

As a consequence even if a user's job title is available to the system it may be the case that there is no match for keywords or terms that job title and hence a job score of '0' will be assigned by the system to that user. In addition, in the embodiment described in U.S. Pat. No. 10,673,876 and previously shown, the only assigned job scores are 0, 5, 6, 10 and the full scale (0, 10) is not utilized.

The job title of the user may be discovered by the security awareness system through information associated with the organization the user belongs to when the organization adopts the security awareness system to increase the cybersecurity awareness of its users. As part of the initialization of the system, the employee information for the company is obtained by the security awareness system. In some examples, this employee information may be provided by the organization to the security awareness system in a comma separated value (.csv) file or in a spreadsheet or other data file. In examples, the employee information is extracted from the organization's Active Directory by the security awareness system. In other examples, a security awareness system administrator may manually enter this information into the security awareness system for the users of an organization. Other methods of the security awareness system acquiring these data records for employees are also possible, for example through Azure or a database import. The employee information for a given employee may also be referred to as an employee's data record, or an employee record or a user's data record, or a user record.

Each employee data record may list the employee's manager. Using Active Directory as an example, a user's organizational information may be included in the user's data record, which may include the manager. In one example, every employee's first level manager is available in each employee's data record. In some embodiments, the security awareness system schema determines connections between users and their managers using the email addresses of the users and the user's manager. For example, an employee's data record may identify the employee's manager by the manager's email address. The security awareness system can search the employee data records of the organization for that manager's email address, to determine who that manager is, as well as which other employees list that employee as their manager, in addition to determining the person that the manager themself reports to. Using these connections of employees to their managers found in employee data records, the organizational hierarchy (also referred to as the organization topology, the organization chart, or the organization graph) can be determined from the employee records. In embodiments, multiple levels of hierarchy may be present in an employee's data record, and the security awareness system schema determines connections between users and their managers using all hierarchical information present in the employee data records. The security awareness system may periodically or occasionally recreate the organization graph from the employee records or user records files (e.g., build and rebuild the organization graph so as to capture any organizational changes that happen over time).

By representing the structure of an organization as a graph, there is sufficient information to make predictions about the users' levels of influence and access to data within the organization. This is based upon an assumption that a user's influence and access to sensitive data is directly correlated to their rank within the organization's hierarchy.

Figure 6:
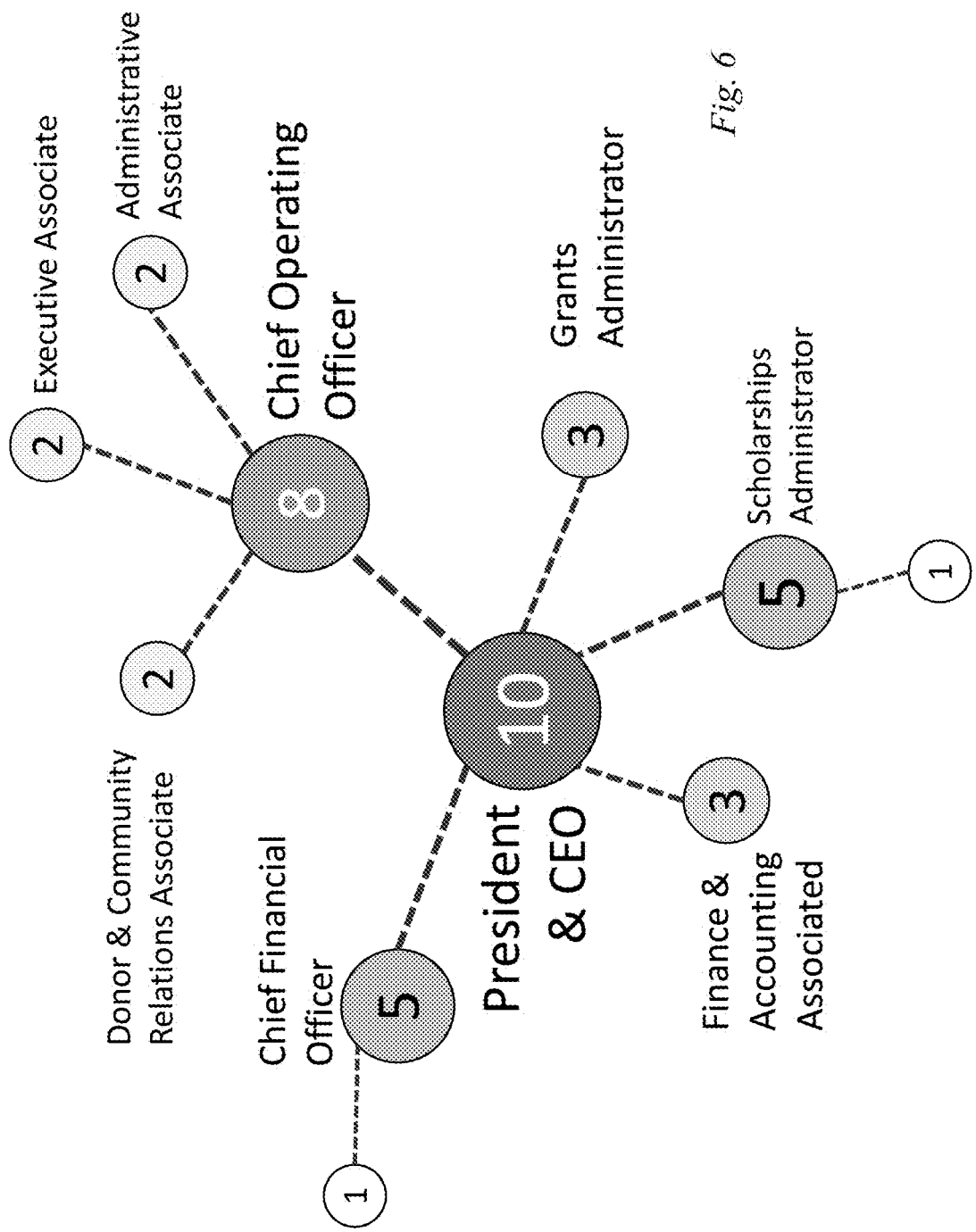
FIG. 6 illustrates an example of an organization graph for a representative organizational structure.

FIG. 6 is an example of an organization graph for a single organization. A numeric label or score is assigned to each node which represents a user within an organization, wherein the numeric label or score represents users' importance within the organization. In general, an organization can be represented as an organization graph G(N,E), where the nodes of the graph (N) are the organization's employees, and the edges of the graph (E) are given by the managerial relationships between employees.

In examples, once the organization graph has been created, the centrality is calculated to arrive at a risk value (or score) for each node (or employee). In graph analytics, centrality is used to measure the importance (or "centrality") of various nodes in a graph. There are different methods of calculating centrality. In some examples, the centrality of the graph is calculated using degree centrality. Using this approach, the degree of a node in the graph (e.g., the degree of a person in the organization of the graph) is defined as the number of direct connections a node has with other nodes. In some examples, the edges in the graph are given a direction and the degree of a node is further divided into an In-degree (in this example, the number of people that report to the person) and an Out-degree (the one or more people that the person reports to). Degree Centrality defines the importance of a node in a graph as being measured based on its degree, e.g., the higher the degree of a node, the more important it is in a graph.

In some examples, the centrality of each node in the graph is calculated using closeness centrality. This approach considers the Geodesic distance between two nodes in a graph. The Geodesic distance, d, between two nodes, A and B, is defined as the number of edges between these two nodes on the shortest path (that is the path with minimum number of edges) between them. Closeness centrality defines the importance of a node in a graph as being measured by how close it is to all other nodes in the graph, calculated as sum of the geodesic distances between that node to all other nodes in the network.

In some examples, the centrality of each node is calculated using betweenness centrality. This centrality metric defines and measures the importance of a node in a graph based upon how many times the node occurs in the shortest path between all pairs of nodes in a graph. Nodes having the highest betweenness centrality are the nodes that are on the shortest paths between the largest number of pairs of nodes and hence are crucial to the communication in a graph as they connect a high number of nodes with each other.

In some examples, the centrality of each node is calculated using Eigen vector centrality, also referred to as Eigen centrality. This metric measures the importance of a node in a graph as a function of the importance of its neighbors. If a node is connected to highly important nodes, it will have a higher Eigen centrality score as compared to a node which is connected to lesser important nodes.

In other examples, the centrality of each node is calculated with PageRank centrality. There are three factors that determine the PageRank of a node: the number of edges it receives, the edge propensity of the edges, and the centrality of the edges.

There are factors related to a user's job that cannot be discerned from a user's job title or their position in an organization's hierarchy, such as departmental responsibilities, internal politics, project assignments, and so on. However, when averaged across an ensemble of organizations, the user's job title may provide a reasonable measure of a user's access and influence in the organization. In other words, when an artificial intelligence model is trained using the organization graphs of an ensemble of organizations, the model can provide a reasonable measure of a user's access and influence based solely on his/her job title.

The security awareness system, for example using the exemplary methods described in this specification, can build organizational topologies of some or all of the organizations that are subscribed to the security awareness platform. The collection of organizational topologies can then be used to train one or more artificial intelligence models, e.g., the ensemble models that will be used to assign users' job scores based on the users' job titles.

Figure 2:
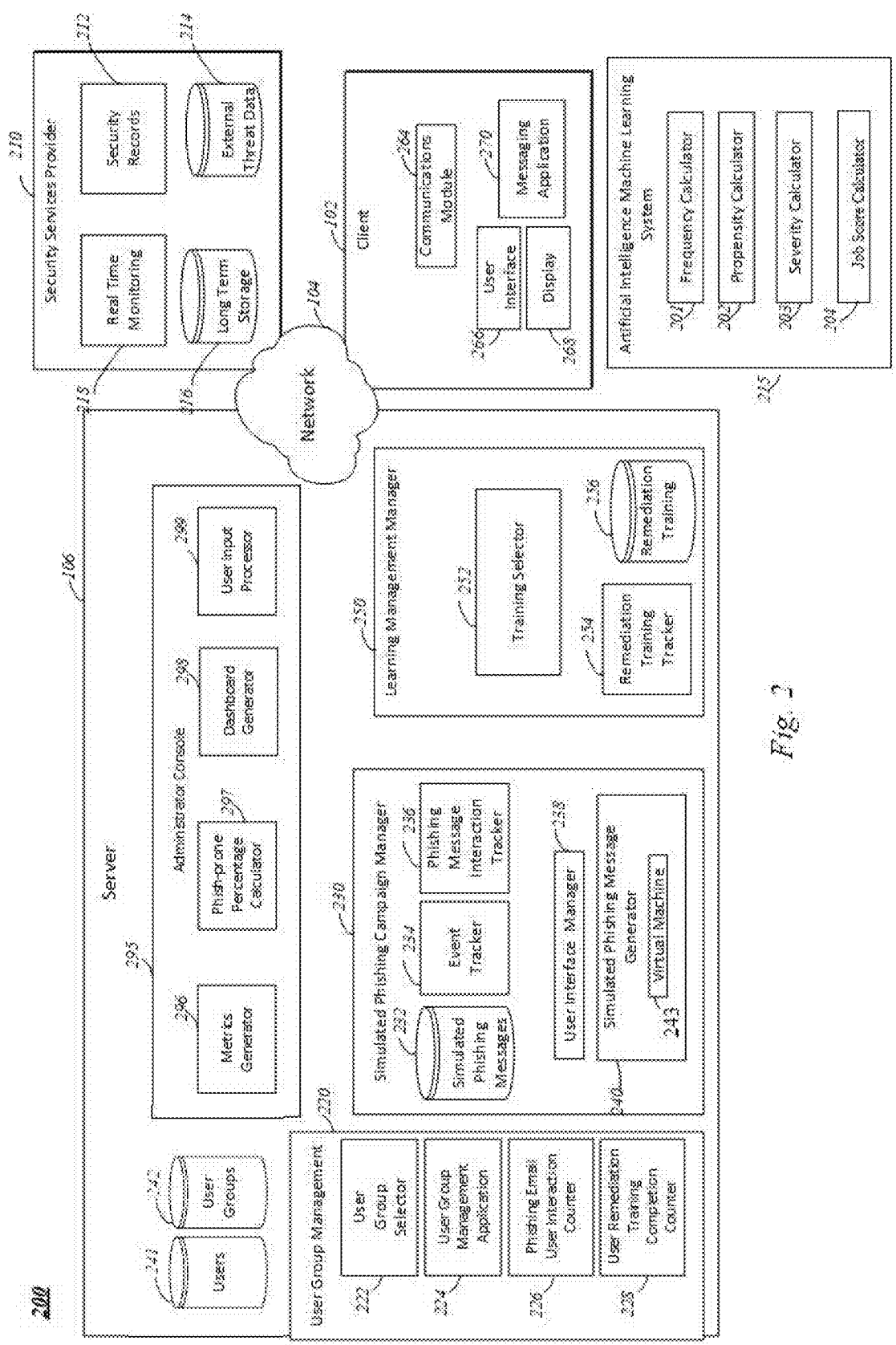
FIG. 2 illustrates some of the architecture of an implementation of a system capable of determining job scores based on job titles as part of a security awareness system.

Referring to FIG. 2 in a general overview, FIG. 2 depicts some of the architecture of a security awareness system 200 capable of determining vulnerability scores for malicious cyberattacks using artificial intelligence, and of calculating metrics in a security awareness system while ensuring that the results of simulated phishing attacks are attributed to the correct user.

In some embodiments, system 200 is configured to calculate metrics and/or vulnerability scores and is capable of using calculated metrics and/or vulnerability scores to inform individualized user or group user training. In some embodiments, calculated metrics and/or vulnerability scores may be used to inform individualized and group reporting. In some implementations, the system 200 includes one or more servers 106, one or more clients 102, and one or more security services providers 210. Server 106 may include administrator console 295, which may include metrics generator 296, phish-prone percentage calculator 297, dashboard generator 298, and user input processor 299. Server 106 may include user group manager 220, which may include user group selector 222, user group management application 224, phishing message user interaction counter 226, and user remediation training completion counter 228. Server 106 may include simulated phishing campaign manager 230, which may include a storage for simulated phishing messages 232, event tracker 234, phishing message interaction tracker 236, user interface manager 238, and simulated phishing message generator 240, which may include virtual machine 242. Server 106 may include learning management manager 250 which may include training selector 252, remediation training tracker 254, and remediation training storage 256. Server 106 may also include storages for users 241 and user groups 242.

System 200 may include client 102, which may include communications module 264, user interface 266, display 268, and messaging application 270. System 200 may also include security services provider 210, which may include real time monitoring 218, security records 212, long term storage 216, and external threat data 214. System 200 may include network 104 allowing communication between these system components.

System 200 may include an artificial intelligence machine learning system 215 configured to determine or calculate risk scores for users. Artificial intelligence machine learning system may include frequency calculator 201, propensity calculator 202, severity calculator 203, and job score calculator 204. Artificial intelligence machine learning system may be configured to communicate with user group management 202, for example to determine the users of an organization.

Referring to FIG. 2 in more detail, simulated phishing campaign manager 230 may be e.g., a security manager, a third-party security consultant, a risk assessor, or any other party. Simulated phishing campaign manager 230 may wish to direct a simulated phishing attack by interacting with user group manager 220 and client 102 through simulated phishing campaign manager 230 installed on a device. The device may be, for example, a desktop computer, a laptop computer, a mobile device, or any other suitable computing device. The simulated phishing campaign manager 230 may be e.g., an application on a device that allows for a user of the device to interact with the simulated phishing campaign manager 230 for e.g. purposes of tailoring and/or executing a simulated phishing attack. Administrator console 295 may allow a user, also known as an administrator, to view and/or process and/or analyze the results of a simulated phishing attack. Administrator console 295 may interact with event tracker 234, phishing message interaction tracker 236, phishing message user interaction counter 226, user remediation training completion counter 228, and remediation training tracker 254 to allow an administrator to view and/or process and/or analyze historical behaviors or users and/or groups with respect to real and simulated phishing attacks. Administrator console 295 may interact with security services provider 210, which may include real time monitoring 218, security records 212, and external threat data 214 that are related to users that are managed by the system 200.

In an implementation, simulated phishing campaign manager 230, when executed on the device, causes a graphical user interface to be displayed to a system administrator via the administrator console 295, which allows for user input through a non-graphical user interface, e.g., a user interface that accepts text or vocal input without displaying an interactive image. A graphical user interface may be displayed on a screen of a mobile phone, or a monitor connected to a desktop or laptop computer or may be displayed on any other display. The user may interact with the graphical user interface on the device by typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a device capable of opening a network connection to simulated phishing campaign manager 230 or to the administrator console 295 or may be any other type of interface.

In an implementation, the simulated phishing campaign manager 230 may make choices concerning how a simulated phishing attack is to be carried out. For example, a graphical user interface run by the administrator console 295 may be displayed by the simulated phishing campaign manager 230 on a display of the device. The simulated phishing campaign manager 230 may accept input parameters for a simulated attack that affect how it will be carried out. For example, simulated phishing campaign manager 230 may interact with user group manager 220 to make choices as to which users from users storage 241 or which user groups from user groups storage 242 to include as potential targets in the simulated attack. User group manager 220 may control the method of determining which users are to be selected as targets of the simulated attack, and simulated phishing campaign manager 230 may control the timing of various aspects of the simulated attack, whether to use an simulated attack template that includes values for one or a plurality of simulated attack parameters, how responses from targeted users should be uniquely identified, and other choices. These choices may be made by selecting options displayed on a graphical user interface from dropdown menus, being presented with choices through a simulated attack wizard, or in any other appropriate manner.

In an implementation, the simulated phishing campaign manager 230 may process input from the administrator console 295 to access and/or change settings of an account maintained with any party involved with the simulated attack, such as, for example, a third-party security service provider, or a party that manages interactions with a third-party security services provider 210 to access and/or change settings of an account maintained with a third-party security services provider 210. Simulated phishing campaign manager 230 may manage various aspects of a simulated phishing attack. For example, simulated phishing campaign manager 230 may process input from the administrator console 295, may provide access as needed to various applications, modules, and other software components of the security awareness server 106 to other various applications, modules, and other software components of the simulated phishing campaign manager 230, may monitor and control timing of various aspects of a simulated attack, may process requests for access to attack results, or may perform other tasks related to the management of a simulated attack.

In an implementation, system 200 includes a security awareness system server 106. The security awareness system server 106 may be a part of a cluster of servers. In some implementations, tasks performed by the security awareness system server 106 may be performed by a plurality of security awareness system servers. These tasks may be allocated among the cluster of servers by an application, service, daemon, routine, or other executable logic for task allocation. The security awareness system server 106 may include a processor and memory.

In some implementations, simulated phishing campaign manager 230 or administrator console 295 may include a user input processor. The user input processor may receive input from for example an administrator using the administrator console 295 to manage a simulated phishing attack. The user input processor may be, for example, a library, application programming interface (API), set of scripts, or any other code that may be accessed by, or executed via a network connection by, or provide callback methods for, simulated phishing campaign manager 230.

In an implementation, the user input processor may be integrated with the memory. The memory may store data such as parameters and scripts associated with a particular simulated phishing attack. For example, the memory may store a set of parameters and scripts corresponding to the choices made by a simulated phishing campaign manager 230 for a particular simulated phishing attack.

In an implementation, simulated phishing campaign manager 230 includes simulated phishing message generator 240. Simulated message generator 240 may be integrated with the memory so as to provide the simulated phishing message generator 240 accesses to parameters associated with messaging choices made for a particular simulated attack by e.g. the simulated phishing campaign manager 230. The simulated phishing message generator 240 may be an application, service, daemon, routine, or other executable logic for generating messages. The messages generated by simulated phishing message generator 240 may be of any appropriate format. For example, they may be email messages, text messages, messages used by particular messaging applications such as, e.g., WhatsApp™, or any other type of message. Message types to use in a particular attack may be selected by e.g. a simulated phishing campaign manager 230. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine 243 or may simply be run on an operating system of the security awareness system server 106 or may be run in any other appropriate environment.

In some implementations, the simulated phishing message generator 240 may be configured to generate messages having characteristics that facilitate identification of targeted users. In some embodiments simulated phishing message generator 240 may include a unique identifier in each simulated attack message sent to a target. In examples, messaging application 270 of client 102 may include a unique identifier in each simulated phishing message that client 102 that is the targeted user either replies to or forwards to a different client 102'.

In some implementations, each simulated phishing message sent to a target may include a unique identifier. In embodiments, a unique identifier may be a series of numbers and/or letters, or a unique string of characters. In some examples, the unique identifier may be included in the subject of the message or in the body of the message. In embodiments, the unique identifier may be included in the header of the simulated phishing message. In examples, the unique identifier may be a unique email address in either the "From:" field or the "Cc:" field of the email. In still other examples, the unique identifier may be included within a separate file that is attached to the email.

The unique identifier can help to determine the identity of the target user for a simulated phishing message if the user fails the simulated phishing test. In examples, a user who replies to a simulated phishing message is considered by simulated phishing campaign manager 230 to have failed the simulated phishing test. In some embodiments, a user who forwards a simulated phishing message is considered by simulated phishing campaign manager 230 to have failed the simulated phishing test. In implementations in which the unique identifier is included, for example, within the header of the simulated phishing message, the subject line of the simulated phishing message, the body of the simulated phishing message, or a file attached to the simulated phishing message, a reply email received by simulated phishing campaign manager 230 may also include the unique identifier within the header, the subject, or the body of the simulated phishing message. The reply to the simulated phishing message can be processed by phishing message interaction tracker 236 to extract the unique identifier, and the unique identifier can be used to identify the original target of that simulated phishing communication. Thus, even if the reply to the simulated phishing communication is sent from an email address that is not known to be associated with the original target of that simulated phishing message, the unique identifier may be used to determine the identity of the target who originally received the simulated phishing message such that the failure may be attributed to the correct user.

Similarly, in implementations in which the unique identifier is included within a header of the simulated phishing communication, for example in the "From:" or "Cc:" fields of the header of the simulated phishing communication, a reply message sent by the target also will include the unique identifier within the "To:" or "Cc:" fields. The simulated phishing campaign manager 230 receives the reply message and may extract the unique identifier from the "To:" or "Cc:" fields, and the unique identifier can be used to determine the identity of the original target of the simulated phishing email.

The system 200 also includes the client 102. Client 102 may also be referred to as user 102 and may also be a client device or user device. The terms client and client device, or user and user device may be used interchangeably. A user in the system may be referred to a target or a target device, or an employee or employee device. As described above, a user may be any target of a simulated phishing attack. For example, the target may be an employee, member, or independent contractor working for an organization that receives security checkups or ongoing simulated phishing attacks to maintain security awareness. Target device 102 may be any device used by the target of the simulated phishing attack. The target need not own the device for it to be considered a target device 102. Target device 102 may be any computing device, e.g. a desktop computer, a laptop, a mobile device, or any other computing device. In some implementations, target device 102 may be a server or set of servers accessed by the target. For example, an employee or member of an organization may access a server that is owned or managed or otherwise associated with the organization. Such a server may be target device 102.

In some implementations, the target device 102 may include a processor and memory. The target device 102 may further include a user interface 266 such as, e.g., a keyboard, a mouse, a touch screen, or any other appropriate user interface. This may be a user interface connected directly to target device 102, such as, for example, a keyboard connected to a mobile device, or may be connected indirectly to a target device 102, such as, for example, a user interface of a client device used to access a server target device 102. The target device 102 may include display 268, such as, e.g., a screen, a monitor connected to the device in any manner, or any other appropriate display.

In an implementation, the target device 102 may include a messaging application 270. Messaging application 270 may be any application capable of viewing, editing, and/or sending messages. For example, messaging application 270 may be an instance of an application that allows viewing of a desired message type, such as any web browser, a Gmail™ application, Microsoft Outlook™, WhatsApp™, a text messaging application, or any other appropriate application. In some implementations, messaging application 270 can be configured to display simulated attack emails. Furthermore, messaging application 270 may be configured to allow the target to generate reply messages in response to simulated attack messages displayed by messaging application 270. For example, messaging application 270 may be configured to allow the target to forward simulated attach messages displayed by messaging application 270.

In some implementations, target device 102 may include communications module 264. This may be a library, application programming interface (API), set of scripts, or any other code that may facilitate communications between the target device 102 and any of security awareness system server 106, security services provider 210, or any other server. In some implementations, communications module 264 determines when to transmit information from target device 102 to external servers via network 104. In some implementations, the information transmitted by communications module 264 may correspond to a simulated attack message, such as an email, generated by messaging application 270.

In implementations, the security awareness system server 106 includes learning management manager 250. Learning management manager 250 may include a database of remediation training 256. Database 256 may be integrated with learning management manager 250. In some embodiments, learning management manager 250 includes remediation training tracker 254, which may be configured to keep track of the training undertaken by each user in system 200. Remediation training tracker 254 may be configured to maintain a schedule of upcoming training to be undertaken by a user in the system. Remediation training database 256 may include training modules that are available for selection for training for users of system 200. In some embodiments, remediation training database 256 includes pointers to external training offerings which are not stored in remediation training database 256, but which are stored elsewhere in server 106 or as part of a third-party server or service. Being correctly able to identify the target user of a simulated phishing communication message may guide learning manager 250 to choose specific remedial training that addresses the mistake that the target user made which lead the target user failing the simulated phishing test.

In some implementations, system 200 includes security services provider 210. In some embodiments, this functionality is referred to as a security information management system (SIMS), security event management system (SEMS), or security information and event management system (STEMS). These systems, herein collectively referred to as a security information and event management system (SIEMS) may collect, monitor and analyze security-related data from computer logs, including event log data from security devices, such as firewalls, proxy servers, intrusion detection systems, intrusion prevention systems, file systems, routers, switches, and antivirus software. A STEMS, automates the process of collecting, monitoring and analyzing security-related data from computer logs, including event log data from security devices, such as firewalls, proxy servers, intrusion detection systems, intrusion prevention systems, file systems, routers, switches, and antivirus software and translates the logged data into correlated and simplified formats. A STEMS may monitor events in real-time, display a real-time view of activity, translate event data from various sources into a common format, typically XML or JSON, aggregate data, correlate data from multiple sources, cross-correlate to help administrators discern between real threats and false positives, provide automated incidence response, and send alerts and generate reports. A SIEMS may collect and centrally manage records of network, application, device, security, and user activity from different infrastructure sources. Reports may be defined for a STEMS, and a STEMS may also provide query functionality for both real time and historical records.

Commercial STEMS products include ArcSight ESM (Micro Focus, Newbury, England), nFX's SIM One (netForensics inc., Edison, N.J.), envision (Network Intelligence, Westwood, Mass.), EventTracker (EventTracker, Fort Lauderdale, Fla.), Trigeo (TriGeo Network Security, Post Falls, Id.), Symantec's Security Information Manager (Symantec, Mountain View, Calif.), Cisco Security Manager, MARS (Cisco, San Jose, Calif.), and Snare (Snare Solutions, Adelaide, Australia). Open source SEIMS products include OSSIM, a product of the Open Source Security Information Management initiative, and Prelude, from PreludeIDS. SEIMS may use normalization, which means automatically pulling common data items from each event (like who, what, when and where) and storing this subset of information into a common format. Security awareness systems can use this common format to find records which may be relevant to users in the security awareness system.

Metasploit (Rapid7), Canvas (Immunity) and Core Impact (Core Security Technologies) are examples of vulnerability testing systems that can be used to test the vulnerability of computer systems, or to break into remote systems. Metasploit 3.0 introduces fuzzing tools which are used to discover software vulnerabilities. Metasploit can be used by securities teams who need to identify vulnerabilities in software and systems, which their users may be exposed to.

Mimecast (London, UK) is an example of a secure email gateway that provides cloud-based anti-virus and anti-spam protection as well as many other security services such as DNS Authentication services, including Sender Policy Framework (SPF), DomainKeys Identified Mail (DKIM) and Domain Message Authentication Reporting and Conformance (DMARC) to address sender spoofing, prevention against impersonation attacks, prevention against the delivery of malicious attachments through the application of multiple signature-based, static and sandboxing security inspections, protection against malicious URLs, whether they are lures to phishing or malware drop sites.

SIEMS, vulnerability testing systems, and secure email gateways can all produce information about the threats that an organization or an individual has been exposed to, which may not be apparent to the security awareness system. In some embodiments, a user may use systems or software that have been determined to be vulnerable by a vulnerability testing system. In some embodiments, a user may have been targeted by a number of malicious attacks which have been stopped by a secure email gateway before they reached the company's email system. In some embodiments, a user may be recognized within a SIEMS to be associated with one or more security threats or incidents that are recorded by the SIEMS.

In some embodiments, security services provider 210 is a security appliance. Security services provider 210 may comprise any of the aforementioned embodiments as well as other embodiments of security services that perform the functionality presently described. Security services provider 210 may monitor events in real-time, display a real-time view of activity, translate event data from various sources into a common format, typically XML or JSON, aggregate data, correlate data from multiple sources, cross-correlate to help administrators discern between real threats and false positives, provide automated incidence response, and send alerts and generate reports. Security services provider 210 may collect and centrally manage records of network, application, device, security, and user activity from different infrastructure sources. Reports may be defined for security services provider 210, and security services provider 210 may also provide query functionality for both real time and historical records.

In the systems and methods of the present invention, security awareness system server 106 may receive information from any of the aforementioned systems and may use this information to generate additional reports and metrics related to users in the security awareness system. An API could be provided to enable the security awareness system to receive the information from the aforementioned systems in a common format. In some embodiments, a security awareness system server 106 may use information from any of the aforementioned systems in a learning management system, in order to tailor training to a specific individual.

Security services provider 210 may also include vulnerability testing systems that can be used to test the vulnerability of computer systems, or to break into remote systems. Examples of vulnerability testing systems include Metasploit (RSIMSd7), Canvas (Immunity) and Core Impact (Core Security Technologies). As a further example, Metasploit 3.0 introduces fuzzing tools which are used to discover software vulnerabilities. Metasploit can be used by securities teams who need to identify vulnerabilities in software and systems, which their users may be exposed to.

Security services provider 210 may include vulnerability testing systems, and secure email gateways can all produce information about the threats that an organization or an individual has been exposed to, which may not be apparent to the security awareness system. In some embodiments, a user may use systems or software that have been determined to be vulnerable by a vulnerability testing system. In some embodiments, a user may have received a number of attacks which have been stopped by a secure email gateway before they reached the company's email system. In some embodiments, a user may be recognized within a SIEMS to be associated with one or multiple security threats or incidents that are recorded by the STEMS.

System 200 may include artificial intelligence machine learning system 215. Artificial intelligence machine learning system 215 may contain frequency calculator 201, propensity calculator 202, severity calculator 203, and job score calculator 204. In some embodiments, artificial intelligence machine learning system 215 includes models to predict (for example based outputs from frequency calculator 201, propensity calculator 202, severity calculator 203, and job score calculator 204) user responses to malicious attacks and to predict the severity of the organizational harm that would result if the user responds to a malicious attack and to create a user risk score representative of these predictions. In some embodiments, data collection is performed on an ongoing basis, and updated data and/or data sets (also referred to as data records) may be used to re-train machine learning models or create new machine learning models that evolve as the data changes. Artificial intelligence machine learning system 215 may receive data from simulated phishing campaign manager 230, learning management manager 250, user group management manager 220, security services provider 210, or other external sources. Artificial intelligence machine learning system 215 may be part of server 106, may be hosted separately on a different server, or on cloud 108. In another embodiment, artificial intelligence machine learning system 215 may calculate aggregate group risk scores derived from one or more individual risk scores.

In embodiments, job score calculator 204 of artificial intelligence machine learning system 215 may retrieve or receive data from user group management manager 220. For example job score calculator may receive, for one or more organizations, data records comprising the names of the users of the organization, the email addresses of the users of the organization, and the email addresses of the users' managers. In embodiments, job score calculator 204 may utilize organizational data to train one or more models that are useful for determining a job score based on a user's job title. In embodiments, server 106 may be configured to provide job score calculator 204 with a user's job title. Job score calculator 204 may feed one or more trained artificial intelligence models, for example an ensemble model, with the provided user's job title and may return a job score for the user to one or more of frequency calculator 201, propensity calculator 202, and severity calculator 203. In embodiments, artificial intelligence machine learning system 215 may retrieve or receive information from one or more of frequency calculator 201, propensity calculator 202, severity calculator 203, and job score calculator 204 and may calculate one or more user risk scores. In embodiments, artificial intelligence machine learning system 215 may calculate a group risk score comprising one or more user risk scores. Artificial intelligence machine learning system 215 may communicate one or more user risk scores or group risk scores to server 106. Server 106 may display one or more user risk scores and/or group risks scores to an administrator by way of dashboard generator 298.

System 200 may include network 104. Network 104 may be any type and/or form of network. The geographical scope of network 104 may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. Network 104 may be a type of a broadcast network, a telecommunications network, a data communication network, or a computer network.

Figure 3:
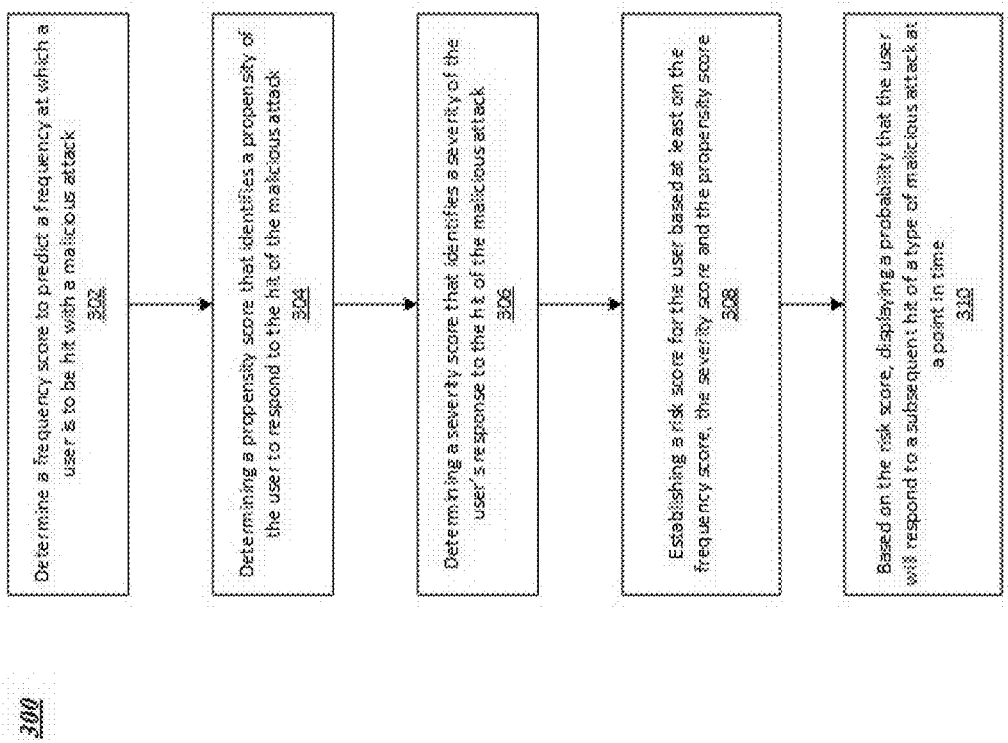
FIG. 3 depicts one embodiment of a method for calculating user risk scores.

Referring to FIG. 3, in a general overview, FIG. 3 depicts a method for establishing a user risk score. In step 302, artificial intelligence machine learning system 215 determines a frequency score to predict a frequency at which a user is to be hit with a malicious attack. In step 304, artificial intelligence machine learning system 215 determines a propensity score that identifies a propensity of the user to respond to the hit of the malicious attack. In step 306, artificial intelligence machine learning system 215 determines a severity score that identifies a severity of the user's response to the hit of the malicious attack. In step 308, artificial intelligence machine learning system 215 establishes a risk score of the user based at least on the frequency score, the severity score and the propensity score. In step 310, based on the risk score, artificial intelligence machine learning system 215 displays a probability that the user will respond to a subsequent hit of a type of malicious attack at a point in time.

Referring to FIG. 3 in more detail, in step 302, artificial intelligence machine learning system 215 determines a frequency score to predict a frequency at which a user is to be hit with a malicious attack. In some embodiments, artificial intelligence machine learning system 215 determines a frequency score based on a job score. The job score may comprise a value based on a user's job title. In examples, artificial intelligence machine learning system 215 determines a frequency score based on a breach score. The breach score may comprise a value identified based on the user's level of exposure to security breaches.

In embodiments, the risk score of an individual may be represented as:

$$\text{Risk Score(RS)} = f\{f(H), p(R|H), s(R,H)\} = RS(f, p, s)$$

where:
H=a hit, de fined as any kind of malicious attack
f(H)=frequency of potential harmful hits H
p(R|H)=the propensity that an individual will respond to a hit H
R=individual response, e.g. a click, reply, etc.
s(R, H)=the severity of the impact of response R to hit H
subject to constraints:
RS(0,0,0)≥0
RS(1,1,1)=100

In some embodiments, RS(f, p, s) is an increasing function of each of its variables: f, p, and s.

In some embodiments, user responses to hit, which may be a real or simulated malicious attack can include a multitude of user actions, for example but not limited to a user opening a message, clicking on a link in a message, replying to a message, opening an attachment to a message, enabling a macro in a message, entering data in response to a message, reporting a message, or forwarding a message. In some examples, data about user responses to hits may be aggregated, or temporal information may be included, for example the number of days since a user last responded, or how many instances of each type of response (or any type of response) in the last e.g. 30 days, 3 months, 1 year, etc.

In some embodiments, the training and learning history of a user may be partitioned based on the type of course or module that the user performed. In some examples, the training history may be divided into short modules (less than a predetermined duration) or long modules (greater than a predetermined duration). In some examples, training history may be divided based on the type of training, for example classroom training or online training. Training history may include courses that the user is enrolled in by the system, courses that the user has chosen to enroll in voluntarily, courses that the user has started, or courses that the user has completed. Training history may include the time interval between completed training courses.

In some embodiments, user data may be referred to as user data record. In embodiments, a user data record may be arranged in a tabular format, whereby the rows of the table represent a phish instance for a user which may include a detailed representation of the user and their phishing and training history at a given point of time. In some embodiments, when training a risk score model, the system uses user data records to learn how the user responded to a specific attack given their history at the time of the attack.

In examples, a component of the user risk score calculation is the frequency score f(H), which reflects the frequency at which individuals are likely to be hit with a malicious attack (H). In some embodiments, the frequency score may be derived from at least a user job score and a user breach score. In some embodiments, job score may be determined by an ensemble model that has been trained using input records based on organization graphs created by user data records. In some embodiments, a breach score may be based on an email exposure check (EEC) threat level, for example a breach score may be defined as follows:

Breach Score(EEC)=$B$=(0,3,10)

where:
0=the user has negligable email exposure
3=the user has moderate email exposure
10=the user has high email exposure It is understood that these example breach scores are demonstrative, and any breach scores may be used, and more or fewer breach scores may be enabled. In some embodiments, breach score information may be decayed over time. In some examples, the data supporting the breach score inputs may be sparse, or in some examples the users may not have a job title which fits into any of these categories, in which case f(H) may take on a baseline value.

In step 304, artificial intelligence machine learning system 215 determines a propensity score that identifies a propensity of the user to respond to the hit of a malicious attack. In embodiments, the propensity score is based at least on training a predictive model with an input of the user history of whether the user responded with a type of response for a given hit of the malicious attack.

In some embodiments, the propensity p(R|H) represents a predictive model component of the risk score RS. In some examples, this value may be produced by:
a. Training statistical and neural network models to learn the mapping from a particular user history (input features) to whether the user responded (response R) on a given malicious attack (H).
b. After repeated exposure to millions of samples, the models learn to predict with some success whether users with given malicious attack and training histories are likely to perform a response R given an attack H.

In some embodiments, the propensity score, p(R|H) is the probability that a given user will respond, for example click, in response to a malicious attack, for example a phishing email, at a particular point in time. The same user may exhibit a different p(R|H) at a later time. To evaluate the predictive performance of the model used to determine the propensity score, we need more than one malicious attack, which allows the model to predict the click rate of a user over a period of time and compare it to the user's actual click rate over that period of time. For example, assume the period of time is one year. For each user, calculate the predicted p(R|H) each time a phishing email hits over one year and record whether or not the user clicked. The propensity score p(R|H) is harder to predict and more variable for users with few phish events. The more data related to real and simulated malicious attacks that is available about a user, the more accurate the risk score RS becomes. In some embodiments, the performance of the propensity score model is assessed by predicting the number of clicks instead of the percentage over a period of time and comparing it to the user's actual clicks over that period of time.

In step 306, artificial intelligence machine learning system 215 determines a severity score that identifies a severity of the user's response to the hit of the malicious attack. In examples, the severity of the user's response represents the harm or potential harm to the user's organization if the user were to respond to the malicious attack. In examples, the severity score for a user may be based at least on the user's job score. In some examples, the severity score may be based at least on a user's individual access to information and systems in the organization.

In some embodiments, user training histories are used in predicting p(R|H) values. When more users have had training, p(R|H) is low, and when fewer users have had training, p(R|H) is high. In some examples, when users have had training recently, p(R|H) is low.

In some examples, calculation is the severity s(R, H) may incorporate a risk booster value, which may be set by a company or system administrator to customize the assessed risk of users or of groups of users. In some embodiments, severity score may be defined as follows:

$s(R,H)$=(−1,0,1,10)

where:
1=below normal risk
0=normal risk (default)
1=elevated risk
10=very high risk It is understood that these example severity score classifications are demonstrative, and any severity score classifications may be used, and more or fewer severity scores may be enabled.

In step 308, artificial intelligence machine learning system 215 establishes a risk score for the user based at least on the frequency score, the severity score and the propensity score. In embodiments, artificial intelligence machine learning system 215 establishes a risk score model as a function of the frequency score, the propensity score, and the severity score. In examples, the function of the frequency score, the propensity score, and the severity score may utilize a weighted or logarithmic function.

In some embodiments, several different processes or workflows are involved in the determination of user risk score. In some embodiments, input records are divided up into groups, and a percentage of the input records are used for training a period model, a percentage of the input records are used for validating a period model, and a percentage of the input records are used for testing a period model. In one example, 80% of the input records are used for training the period model, 10% of the data is used for validation of the period model, and 10% of the data is used for testing the period model. In some embodiments, input records from archived users may be used for any of training, validation or testing of the period model. In some embodiments, the ensemble model is a function of one or more period models. The ensemble model may be updated, trained or retrained periodically as new period models are trained, for example when new input records are available to the system. In some embodiments, period models may be trained and/or ensemble models may be updated daily, weekly, monthly, or yearly. In some embodiments, input records may be added to or removed from groups of input records that are used to train the period models. For example, a user may move from one job level to a different job level, creating a new data record for the user, which may lead to a new organization graph for the user's organization, which may lead to new input records which may then be used to train a period model.

The components of RS (f, p, and s) may represent the expected loss or harm to an organization due to malicious attacks on the organization's users over a period of time. The function calculating the user risk score, RS(f, p, s), in some embodiments may be represented as a weighted sum of logarithms:

$$RS(f,p,s) = w_1 \log f + w_2 \log p + w_3 \log s$$

In some embodiments, the function calculating the user risk score, RS(f, p, s) may be represented as follows:

$$RS(f, p, s) = w_1\log(1 + J + B) + w_2\log(1 + P(R|H)) + \frac{w_3\log\left((1 + J)\left(1.5 + \frac{RB}{2}\right)\right)}{d}$$

where:
$w_1$=settable parameters, normalized so that $0 \leq RS \leq 100$
J=job score B=breach score
RB=severity (s)
and:

$$d = \frac{\log(21 + 100\log(2) + \log(11 \times 6.5))}{100} = 0.77 \text{ when } w_i = 1$$

In embodiments, artificial intelligence machine learning system 215 may establish a group risk score based on a function of risk scores of each user within the group. The use of the highest individual risk score in a group at the risk score for the group is not recommended as it puts too much weight on one single estimate. The average over all individual risk scores in the group is one possible approach to aggregating the risk scores, however this may tend to underestimate the contribution of isolated outliers. In some examples, the approach taken may be referred to as using the standard distance to the perfect score (0), described as follows:

$$RS(\text{group}) = \sqrt{\frac{1}{N}\sum_{i=1}^{N}(RS(i)^2)}$$

where:
N=number of group members
RS(i)=individual risk score of member i
As an example, consider the case where N=100, RS(1)=100, and RS(i)=0, i=2: 100. Then, $RS_{max}$, =100, $RS_{average}$=1, and $RS_{group}$=10.

In step 310, based on the risk score, the server 106 may displays a probability that the user will respond to a subsequent hit of a type of malicious attack at a point in time.

Figure 4:
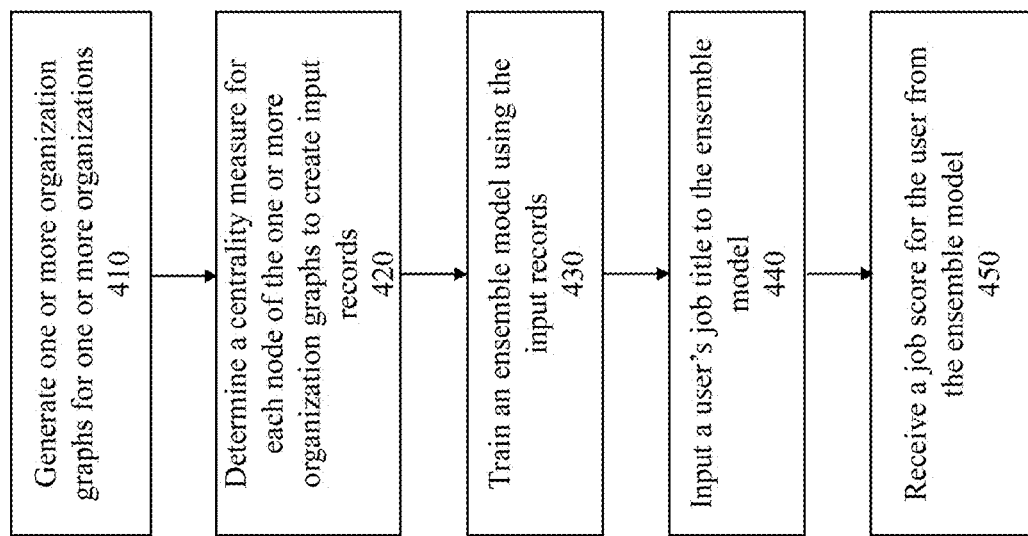
FIG. 4 depicts one embodiment of a method for calculating user job scores.

FIG. 4 illustrates an embodiment of a method describing the process of training and using the one or more models, such as artificial intelligence models useful for determining a user's job score. In step 410, the system generates one or more organization graphs for one or more organizations. In step 420, the system determines a centrality measure for each nodes of the one or more organization graphs to create input records. In step 430, the system trains a model using the input records. In step 440, the system inputs a user's job title to the model. In step 450, the system receives a job score for the user from the ensemble model. The system may use the job score for generating a simulated phishing communication, simulated phishing campaign or electronic or remedial training to the user.

Describing FIG. 4 in more detail, in step 410, the system generates one or more organization graphs for one or more organizations. Employee information for the organization is obtained by the system. In some examples, this employee information may be provided by the organization to the system in a comma separated value (.csv) file or in a spreadsheet or other data file. In examples, the employee information is extracted from the organization's Active Directory by the system. In other examples, a security awareness system administrator may manually enter this information into the security awareness system for the users of an organization. Other methods of the security awareness system acquiring this employee information are also possible, for example through Azure or a database import. The employee information for a given employee may also be referred to as an employee's data record, or an employee record or a user's data record, or a user record.

Each employee record may list at least the employee's manager. Using Active Directory as an example, a user's organizational information may be included in the user's data record, which may include the employee's first level manager. For example, an employee's data record may identify the employee's manager by the manager's email address. The system can search the employee data records of the organization for that manager's email address, to determine who that manager is, as well as what other employees might list that employee as their manager, in addition to determining the person that the manager themself reports to. Where other organizational hierarchical information is included in the employee data record, this information may additional be used to determine employee-manager relationships. Using this technique, the organizational hierarchy (also referred to as the organization topology, the organization chart, or the organization graph) can be determined from the employee data records. The security awareness system may periodically or occasionally recreate the organization graph from employee data records (e.g., build and rebuild the organization graph so as to capture any organizational changes that happen over time). In examples, each employee is a node in the organization graph, and each managerial relationship between employees is an edge in the organization graph.

In step 420, the system determines a centrality measure for each node (e.g., employee) of the one or more organization graphs to create input records. In embodiments, an input record comprises a user's job title and the centrality measure determined for the user (e.g., the centrality measure determined for the node that represents the user). In examples, the centrality measure for a node is the job score for that node. In embodiments, system uses centrality measures of nodes and information about users associated with the nodes, for example the job title of the user, to generate an input record of the form (job title=job score).

Figure 7:
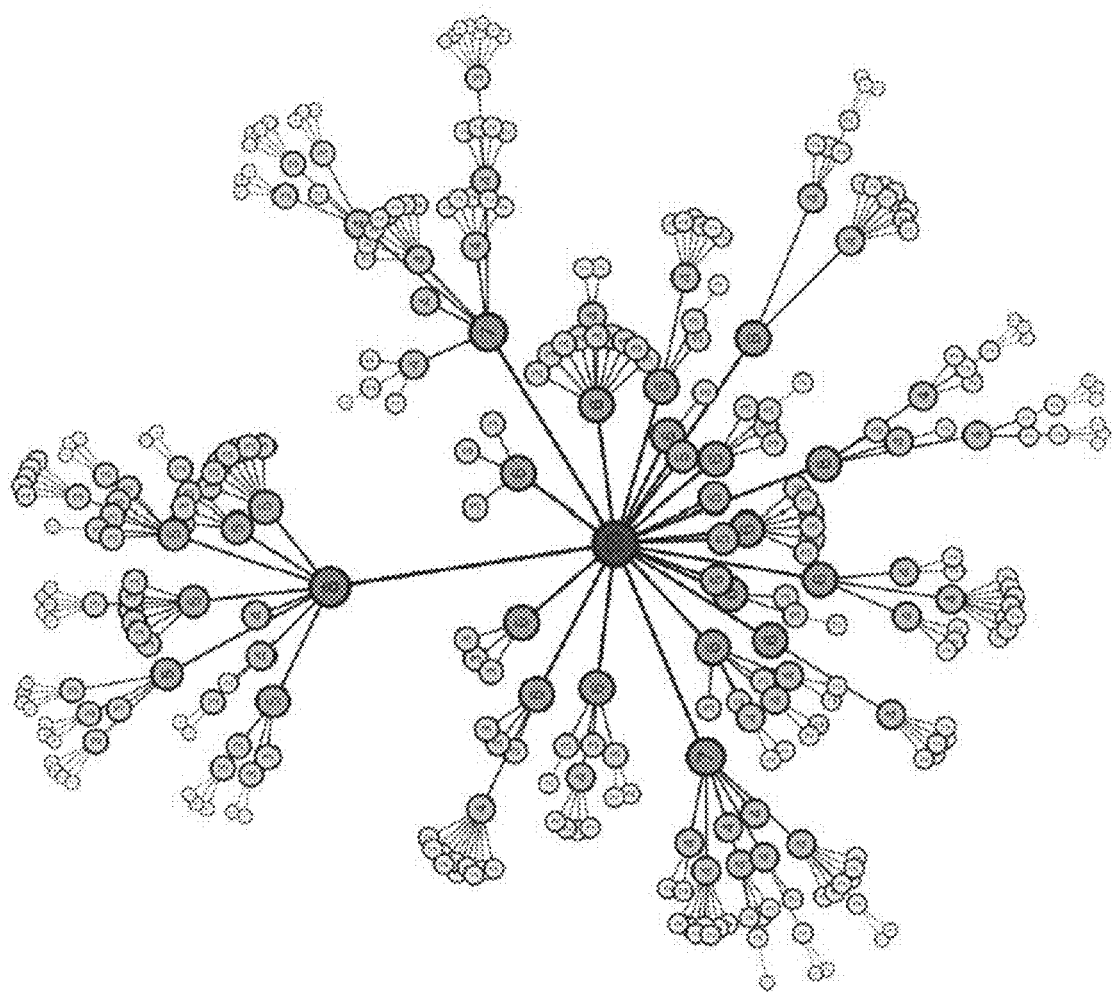
FIG. 7 illustrates a further example of an organization graph for a representative organizational structure.
Figure 8:
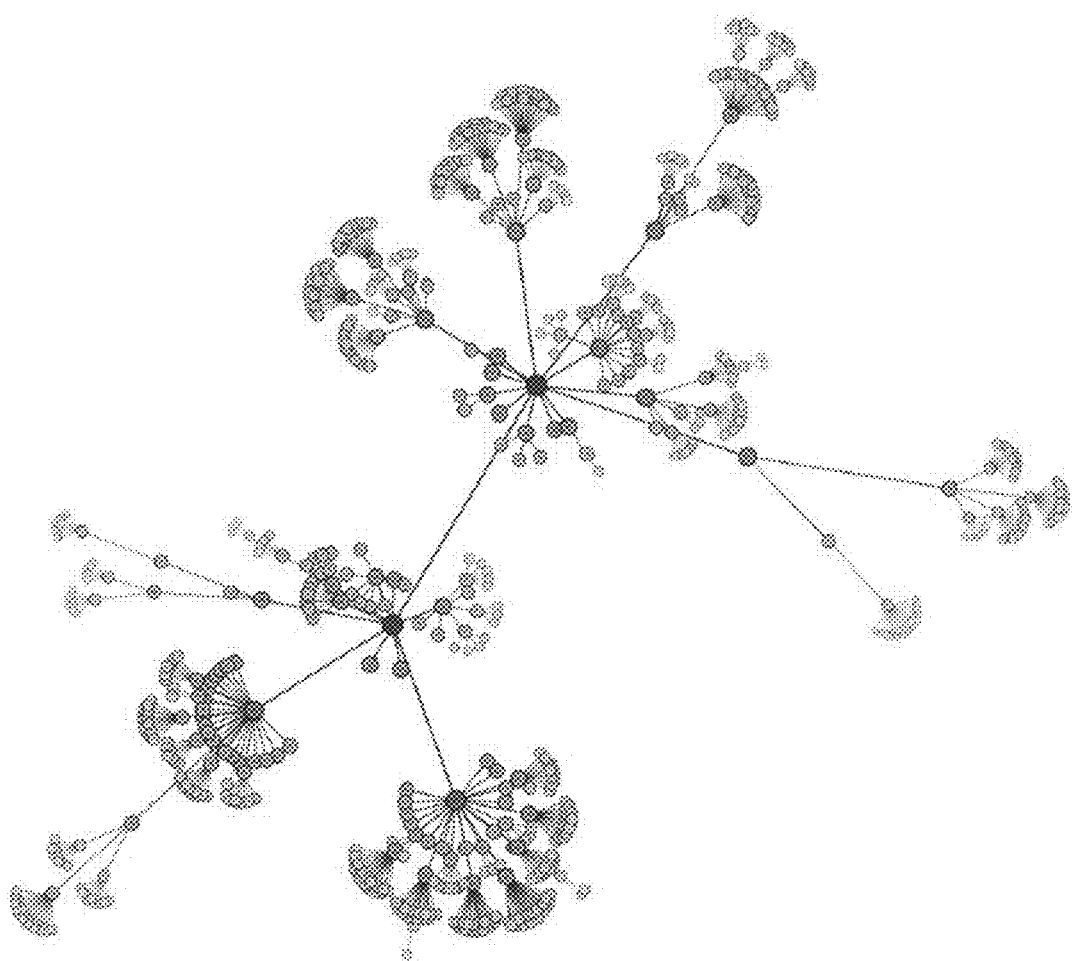
FIG. 8 illustrates a further example of an organization graph for a representative organizational structure.

FIG. 6, FIG. 7, and FIG. 8 all illustrate examples of organization graphs for representative organizations evaluated using a centrality measure. In exemplary embodiments of step 420, the centrality measure of a node in an organization graph is determined using harmonic closeness centrality. In FIG. 6, FIG. 7, and FIG. 8 each node represents an employee, wherein the size and darkness of the node scales with the magnitude of its centrality. In some examples, centrally located nodes have a higher centrality measure, and nodes at the edges of the organization graph have a smaller centrality measure. In examples, the magnitude of the centrality measure for a node may assigned to the job title of that node (employee).

In examples, a normalized representation of the centrality measure for a node may be assigned to the job title of the employee of that node. In examples, the centrality measure of all the nodes (employees) in the organization graph can be normalized, for example to a scale of (1,10). The normalized centrality measure of a node can be used as a measure of the risk associated with the job title of the user represented by that node. In examples, the extreme bounds of the normalized scale (e.g. 1 and 10) may be determined by system by analyzing all the nodes N and edges E of all organizations in the security awareness system. The upper bound may be the most connections (edges, E) of any person (node, N) across all organizations in the security awareness system. In some embodiments, the upper bound may be the greatest E for all N including the input records used to train the one or more artificial intelligence models. This upper bound may be assigned the value "10", and then the rest of the nodes are assigned a value between 1 and 10 by normalizing the number of edges of each node on the scale set by the upper bound. In some embodiments, the value assigned to the node with the least amount of edges (e.g., the number equal to the least connections of any person across the training data) is "1", based on the assumption that every person in an organization has at least a connection (E) to their manager.

Referring to the example organization in FIG. 6 in more detail, the President & CEO occupies the most central position in the organization graph (also referred to as the graph) and has the highest centrality measure. As previously discussed, this can be determined in different ways using different centrality approaches. For example, the President & CEO in FIG. 6 has the greatest number of other users (nodes of the graph) that report to them, directly or indirectly (10 people or nodes). Additionally or alternatively, the President & CEO in FIG. 6 does not report to anyone else. In another approach, the node which has the maximum number of edges before reaching the edge of the graph is also the President & CEO, with the maximum as 2:
(CEO—Chief Operating Office—Executive Assistant)
(CEO—Scholarships Administrator—Employee).

In another embodiment, the job title of a person (node) in the organization graph may be given a score based on a combination of factors. For example, in relation to FIG. 6 the Chief Operating Officer reports directly to the CEO, as does the Scholarships Administrator, but the title 'Chief Operating Officer' is assigned a centrality measure of 8 while the Scholarships Administrator is assigned a centrality measure of 5. This may be, for example, because the Chief Operating Officer has 3 people reporting to them, and the Scholarships Administrator has just one person reporting to them. With respect to FIG. 6, the title 'CEO' is given the highest score (10) and the employee is given the lowest score (1), thereby normalizing the 1-10 scale over all employees.

FIG. 7 and FIG. 8 show other example organization graphs illustrating the centrality analysis of two more organizations, both of which are more complex than the organization shown in FIG. 6. Similar centrality approaches can be applied to determine the centrality measures (e.g., job scores) associated with the job titles for all the nodes (people) in each of these organizations. An input record comprises a job title associated with a job score. In examples, the normalized job score, as determined by the centrality determination, can be referred to as a normalized centrality measure, in which an input record comprises a job title associated with a normalized centrality measure.

Figure 9:
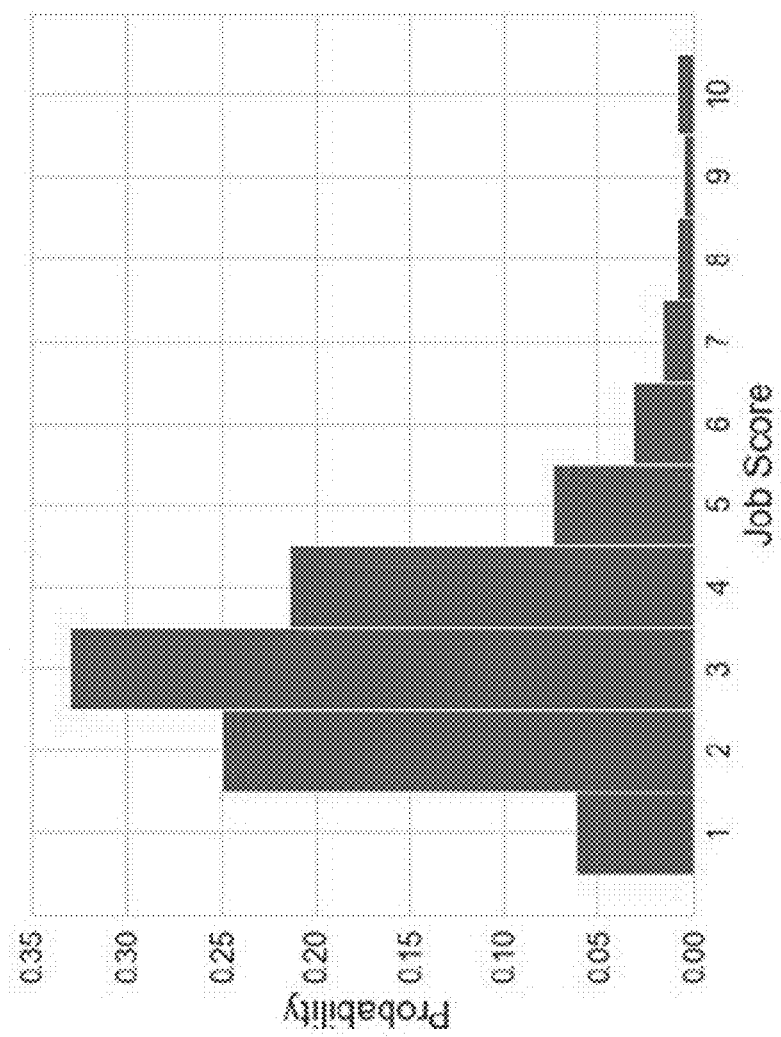
FIG. 9 illustrates a sample distribution of input records across a normalized range of job scores used as training input records for an artificial intelligence model.

In step 430, the system may use input records created by determining a centrality measure for each node of the one or more organization graphs from one or more organizations to train an artificial intelligence model that can be used to accept as inputs job titles, and output job scores (job title→model→job score). In embodiments, a model used to accept as inputs job titles, and output job scores is called an ensemble model. Ensemble models may be created by combining one or more period models that have been trained using different sets of input records. In training the one or more ensemble models, there is a need to ensure that each job score is adequately represented in the training data (input records) provided to the ensemble model. In some examples, the number of samples of input records for each job score in the training data are not equal. FIG. 9 illustrates an example of a distribution of input records, displayed as a histogram. In can be seen that the job scores comprised in the input records indicate a strong skew in job score records towards the lower end of the normalized scale (that is that there are a greater number of examples of job titles with low job scores that there is example of job titles with high job scores. This can be explained by the nature of hierarchical organizational structures that tend to be bottom heavy.

In some examples, an adjustment may be made to the input records to ensure that the ensemble model is capable of accurately predicting job scores for job titles that are associated with the job scores that occur infrequently in the training data. For example, for job scores that appear infrequently in the training data, input records comprising those job scores may be fed into the ensemble model multiple times during the training process in order to equalize the input frequency of input records for each of the job scores. In some examples, the input records comprising the less frequent job scores may be duplicated and then may be modified slightly before being input into the ensemble model during the training process. For example, the job title may be represented as an image, the characters of the job title may be inverted (e.g. flip the letters from last to first). In examples, the job title may be slightly perturbed by changing or omitting characters in the job title.

In other examples, an adjustment may be made to the input records to ensure that the ensemble model is capable of accurately predicting job scores for job titles that are associated with the job scores that occur infrequently in the training data through a weighting of the input records. For example, input records for the less frequent job scores may be given a higher weighting factor than input records for the more frequent job scores.

Figure 10:
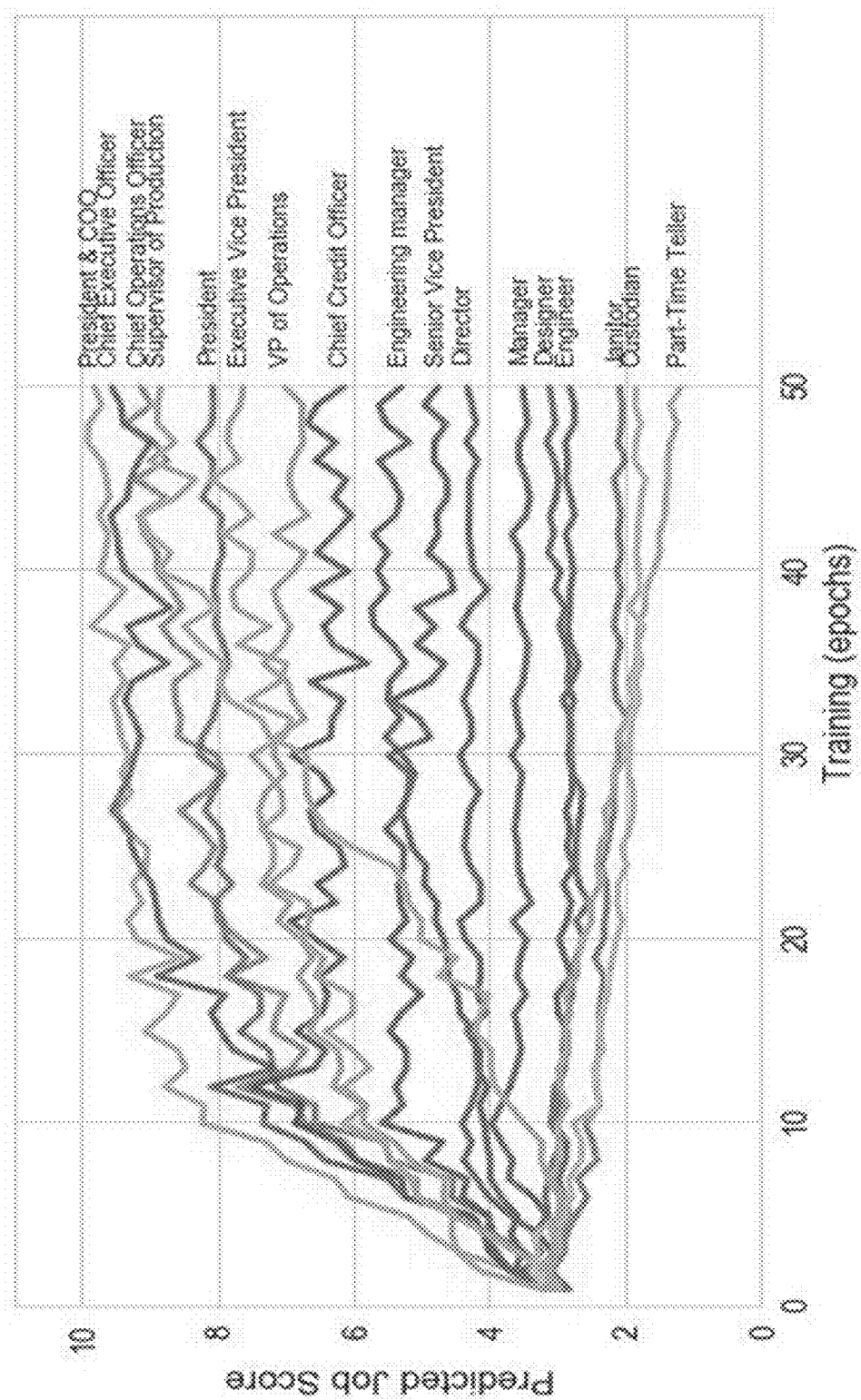
FIG. 10 illustrates predictions of job scores for multiple job titles over multiple epochs of training input records using a recursive neural net artificial intelligence ensemble model.

FIG. 10 is an illustration of AI predictions of job scores for common job titles as an ensemble model is trained over several training epochs. Each epoch represents a full pass over the training data comprising input records generated from multiple organization graphs.

Figure 11:
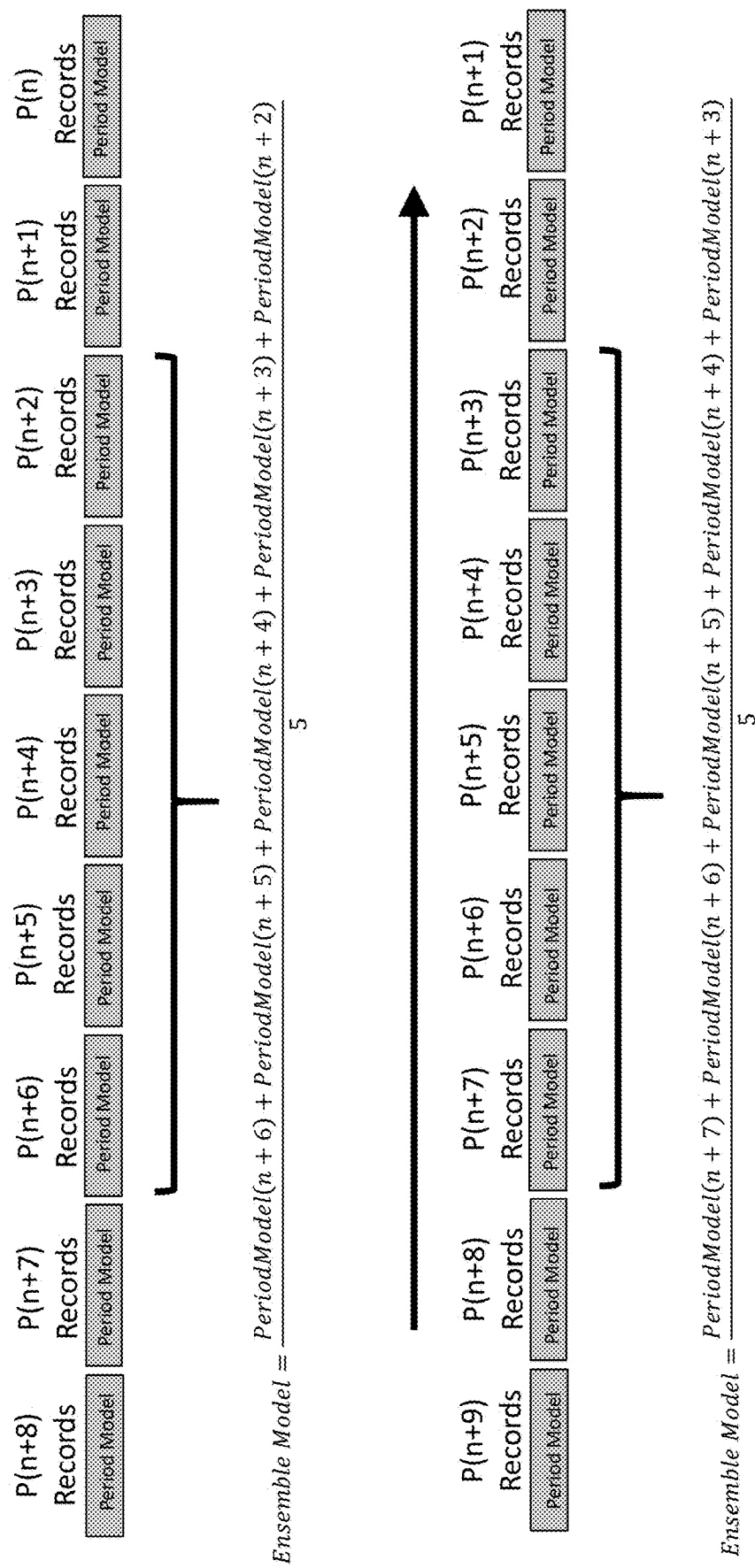
FIG. 11 illustrates an ensemble model training method wherein period models are averaged to create the ensemble model.

Referring again to step 430, in some embodiments, artificial intelligence machine learning system 215 creates a model, such as an ensemble model based on more than one trained period models. In some examples, the weights and starting positions of the neurons for each trained period model are averaged together over a rolling window of several training periods to create an ensemble model. FIG. 11 illustrates one example of the implementation of the creation of an ensemble model using period models trained with input records from multiple periods. Referring to FIG. 11 in detail, in each period (e.g. Period n or P(n) through Period n+8 or P(n+8), input records are obtained as previously described. A period model is created by training an artificial intelligence model using input records. In the example illustrated in FIG. 11, the number of period models averaged in generating the ensemble model is five period models. The number of periods models averaged in some embodiments in creating the ensemble model may be more or less than five period models. In examples, in each subsequent period, the oldest period model is discarded, and the newest period model is added prior to creating the ensemble model from the period models. In embodiments, prior to the training in each period, the period model may be initialized with random weights and random starting positions of all the neurons in the period model. In embodiments, the default configuration of a period model prior to training uses random weights and random starting positions of all the neurons and no initialization is required.

In examples, the period models that are selected to be incorporated in the ensemble model (via averaging or some other combination function) are variable and are not limited to the sequential representation of FIG. 11. For example, the ensemble model may be created by averaging trained period models from every second period, every third period, every fourth period and so on. In other embodiments, the ensemble mode may be created by selecting trained period models randomly to incorporate in the ensemble model. In embodiments, the period models that have the highest number of training inputs are averaged together to create the ensemble model. The number of period models to average together in creating the ensemble model is also variable. The number of averaged period models may be fixed, or it may be programmed by a system administrator. In some examples, the number of period models averaged together in creating the ensemble model may increase or decrease according to a preset pattern or randomly. In some examples, the ensemble model consists of a single trained period model. Although the combination of period models into an ensemble model is described above as being performed by averaging, it is understood that any function operative to combine multiple artificial intelligence models into a single artificial intelligence model may be used.

In step 440, the system may input a job title into the model, such as the ensemble model and the ensemble model will determine the job score for the job title. The job title does not have to be a job title that was used in any of the previous input records created from organization graphs. The ensemble model does not have to have been trained by the system using a specific company's organization graph for the ensemble model to be useful in assigning a job score to the job titles of the organization. That is, once the ensemble model is trained by the system, any user's job title can be fed as an input into the ensemble model and the model will assign a job score to that user. In some embodiments, the job title may be fed into the ensemble model by the system as a single feature. In examples, the ensemble model may apply a Recurrent Neural Net (RNN) structure, and the user job titles are fed into the model by the system at a character-by-character level. The ensemble model may detect patterns in the character sequence and adjust its output according to the perceived importance of patterns based on the earlier training. Applying the character by character method, the ensemble model may capture subtleties in job titles that may not be achieved by simply matching to regular expressions. Additionally this enables the ensemble model to identify, separate, remove or ignore special characters, such as $, %, & and so on. In step 450, the system receives the job score for the user from the ensemble model.

Figure 5:
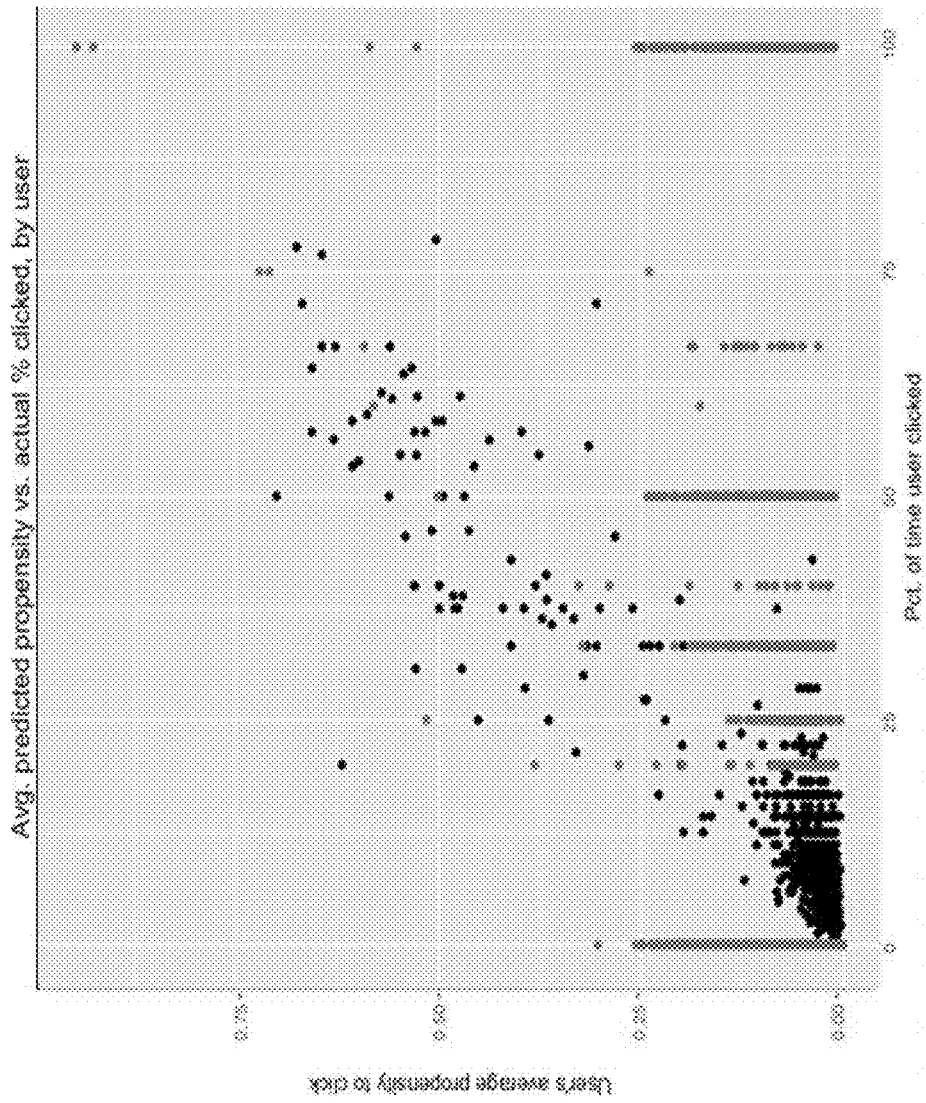
FIG. 5 illustrates the predictive performance of one embodiment of an artificial intelligence model in calculating risk scores.

Referring to FIG. 5, in general overview, FIG. 5 illustrates the predictive performance of the model to calculate a user's propensity score, p(R|H) which may be used to determine a user's risk score. The model's output p(R|H) is the probability that a given user will click (or otherwise respond) to a malicious attack at a particular point in time. In some embodiments, the same user may exhibit a different p at a later point in time. In FIG. 5, the predicted click rate of a user over a period of time is calculated and compared to the user's actual click rate over that period of time to evaluate the predictive performance of the model. The greater the number of simulated or actual malicious attack samples per user, the more accurately the propensity score predicts the user's actual behavior.

It should be understood that the systems described above may provide multiple instances of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, and so on. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method of determining a job score for a user based on a job title of the user, the method comprising:
   generating, by one or more servers, one or more organization graphs for one or more organizations, wherein one or more nodes of the one or more organization graphs is at least based on data for employees of the organization that identify an employee's job title, the employee's email address, and the email address of a manager of the employee;
   determining, by the one or more servers, one or more centrality measures for the one or more nodes of the one or more organization graphs based at least on the data for employees;
   creating, by the one or more servers responsive to determining the one or more centrality measures, for each of the one or more nodes one or more records comprising a job title and the centrality measure assigned to the job title; and
   training, by the one or more servers, a model using the one or more records as input;
   identifying, by the one or more servers, a user for which to determine a job score;
   providing, by the one or more servers, a job title of the user as input to the model; and
   receiving, by the one or more servers, the job score of the user as output from the model.

2. The method of claim 1, wherein the one or more centrality measures comprises one of a harmonic centrality measure, a betweenness centrality measure, a degree centrality measure, a closeness centrality measure, an Eigen centrality measure, or a PageRank centrality measure.

3. The method of claim 1, wherein the one or more centrality measures for the one or more nodes of the one or more organization graphs are determined based on a second model.

4. The method of claim 1, wherein each of the one or more nodes of the one or more organization graphs corresponds to an employee in an organization.

5. The method of claim 1, further comprising determining, by the one or more servers, a user risk score based on applying the job score of the user as input to a second model.

6. The method of claim 5, further comprising using, by the one or more servers, the user risk score of the user for creating a simulated phishing communication to be communicated to a device of the user.

7. The method of claim 5, wherein the second model is configured to take as input at least the job score of the user and provide as output the user risk score.

8. The method of claim 1, wherein the model is retrained by the one or more servers when new input records are available.

9. The method of claim 1, wherein the model is one of a period model or an ensemble model.

10. The method of claim 1, wherein the model comprises an artificial intelligence model.

11. A system for determining a job score for a user based on a job title of the user, the system comprising:
    one or more servers comprising one or more processors, coupled to memory and configured to:
    generate one or more organization graphs for one or more organizations, wherein one or more nodes of the one or more organization graphs is at least based on data for employees of the organization that identify an employee's job title, the employee's email address, and the email address of a manager of the employee;
    determine, one or more centrality measures for the one or more nodes of the one or more organization graphs based at least on the data for employees;
    create, responsive to determining the one or more centrality measures, for the one or more nodes one or more records comprising a job title and the centrality measure assigned to the job title; and
    train, a model using the one or more records as input;
    identify a user for which to determine a job score;
    provide a job title of the user as input to the model; and
    receive the job score of the user as output from the model.

12. The system of claim 11, wherein the one or more centrality measures comprises one of a harmonic centrality measure, a betweenness centrality measure, a degree centrality measure, a closeness centrality measure, an Eigen centrality measure, or a PageRank centrality measure.

13. The system of claim 11, wherein the one or more centrality measures for the one or more organization graphs are determined based on a second model.

14. The system of claim 11, wherein each of the one or more nodes of the one or more organization graphs corresponds to an employee in an organization.

15. The system of claim 11, wherein the model is retrained by the one or more servers when new input records are available.

16. The system of claim 11, wherein the one or more servers are further configured to determine a user risk score based on applying the job score of the user as input to a second model.

17. The system of claim 16, wherein the one or more servers are further configured to use the user risk score of the user for creating a simulated phishing communication to be communicated to a device of the user.

18. The system of claim 16, wherein the second model is configured to take as input at least the job score of the user and provide as output the user risk score.

19. The system of claim 11, wherein the model is one of a period model or an ensemble model.

20. The system of claim 11, wherein the model comprises an artificial intelligence model.

* * * * *